(12) United States Patent
Gibanel et al.

(10) Patent No.: US 11,352,520 B2
(45) Date of Patent: Jun. 7, 2022

(54) COATING COMPOSITIONS FOR PACKAGING ARTICLES SUCH AS FOOD AND BEVERAGE CONTAINERS

(71) Applicant: The Sherwin-Williams Company, Cleveland, OH (US)

(72) Inventors: Sebastien Gibanel, Givry (FR); Benoit Prouvost, L'Abergement de Cuisery (FR)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 16/690,520

(22) Filed: Nov. 21, 2019

(65) Prior Publication Data
US 2020/0231837 A1    Jul. 23, 2020

Related U.S. Application Data

(63) Continuation of application No. 14/902,546, filed as application No. PCT/US2014/045067 on Jul. 1, 2014, now Pat. No. 10,519,337.

(60) Provisional application No. 61/842,044, filed on Jul. 2, 2013.

(51) Int. Cl.
| | | |
|---|---|---|
| *C09D 151/00* | (2006.01) | |
| *C09D 125/08* | (2006.01) | |
| *C08F 265/06* | (2006.01) | |
| *C08F 257/02* | (2006.01) | |
| *B05D 7/14* | (2006.01) | |
| *C09D 5/02* | (2006.01) | |
| *B05D 1/02* | (2006.01) | |

(52) U.S. Cl.
CPC ........... *C09D 151/003* (2013.01); *B05D 7/14* (2013.01); *C08F 257/02* (2013.01); *C08F 265/06* (2013.01); *C09D 5/022* (2013.01); *C09D 125/08* (2013.01); *B05D 1/02* (2013.01)

(58) Field of Classification Search
None
See application file for complete search history.

(56) References Cited

U.S. PATENT DOCUMENTS

| | | |
|---|---|---|
| 3,297,621 A | 1/1967 | Taft |
| 3,705,164 A | 12/1972 | Honig et al. |
| 3,991,216 A | 11/1976 | Christenson et al. |
| 4,129,712 A | 12/1978 | Balatan |
| 4,148,670 A | 4/1979 | Kelly |
| 4,151,143 A | 4/1979 | Blank et al. |
| 4,198,330 A | 4/1980 | Kaizerman et al. |
| 4,289,674 A | 9/1981 | Christenson et al. |
| 4,289,811 A | 9/1981 | Shelley, Jr. |
| 4,305,859 A | 12/1981 | McEwan et al. |
| 4,329,266 A | 5/1982 | Suzuki et al. |
| 4,480,058 A | 10/1984 | Ting et al. |
| 4,487,859 A | 12/1984 | Martino |
| 4,499,212 A | 2/1985 | Martino |
| 4,503,173 A | 3/1985 | Martino et al. |
| 4,547,612 A | 3/1985 | Ranka et al. |
| 4,522,961 A | 6/1985 | Martino et al. |
| 4,567,246 A | 1/1986 | Gajria et al. |
| 4,647,612 A | 3/1987 | Ranka et al. |
| 4,692,491 A | 9/1987 | Ranka et al. |
| 4,894,397 A | 1/1990 | Morgan et al. |
| 4,948,822 A | 8/1990 | Iovine et al. |
| 4,948,834 A | 8/1990 | Baker et al. |
| 4,981,885 A | 1/1991 | Engel et al. |
| 5,166,272 A | 11/1992 | Burks et al. |
| 5,173,526 A | 12/1992 | Vijayendran et al. |
| 5,244,960 A | 9/1993 | Swarup et al. |
| 5,344,675 A | 9/1994 | Snyder |
| 5,461,125 A | 10/1995 | Lu et al. |
| 5,714,539 A | 2/1998 | Perez et al. |
| 5,786,420 A | 7/1998 | Grandhee |
| 5,859,112 A | 1/1999 | Overbeek et al. |
| 5,869,590 A | 2/1999 | Clark et al. |
| 5,939,482 A | 8/1999 | Kriessmann et al. |
| 5,962,571 A | 10/1999 | Overbeck et al. |
| 6,646,041 B2 | 11/2003 | St. John Williams et al. |
| 6,683,145 B2 | 1/2004 | Grandhee |
| 6,730,740 B1 | 5/2004 | Mestach et al. |
| 6,762,240 B2 | 7/2004 | Swarup et al. |
| 6,872,789 B2 | 3/2005 | Brinkhuis et al. |
| 6,992,121 B1 | 1/2006 | Peters et al. |

(Continued)

FOREIGN PATENT DOCUMENTS

| | | |
|---|---|---|
| CA | 2066988 A1 | 10/1992 |
| CN | 1146996 A | 4/1997 |

(Continued)

OTHER PUBLICATIONS

Assuras et al., "New Study Finds that a Chemical Found in Plastic Baby Bottles and Other Plastic Containers and Wraps Could be Dangerous to Your Health," CBS News Worldwide INC, CBS News Transcripts, May 12, 1999, 1 pp.

(Continued)

*Primary Examiner* — Nicole M. Buie-Hatcher
(74) *Attorney, Agent, or Firm* — Shumaker & Sieffert, P.A.

(57) ABSTRACT

An article, comprising a food or beverage container, or a portion thereof, that includes a metal substrate and a coating disposed on at least a portion of the metal substrate. The coating is preferably formed from a coating composition that comprises a latex emulsion having a first-stage emulsion polymerized copolymer and a second-stage emulsion polymerized copolymer.

21 Claims, 2 Drawing Sheets

(56) References Cited

U.S. PATENT DOCUMENTS

| | | | |
|---|---|---|---|
| 7,001,952 B2 | 2/2006 | Faler et al. | |
| 7,241,830 B2 | 7/2007 | Kania et al. | |
| 7,592,047 B2 | 9/2009 | O'Brien et al. | |
| 7,812,079 B2 * | 10/2010 | Brandenburger | C09D 7/43 524/284 |
| 8,013,050 B2 | 9/2011 | Mestach et al. | |
| 8,092,876 B2 | 1/2012 | O'Brien et al. | |
| 8,142,868 B2 | 3/2012 | O'Brien et al. | |
| 8,173,265 B2 | 5/2012 | O'Brien et al. | |
| 8,617,663 B2 | 12/2013 | O'Brien et al. | |
| 8,835,012 B2 | 9/2014 | O'Brien et al. | |
| 9,029,470 B2 | 5/2015 | Rademacher et al. | |
| 9,181,448 B2 | 11/2015 | Li et al. | |
| 9,242,763 B2 | 1/2016 | O'Brien et al. | |
| 9,394,456 B2 | 7/2016 | Rademacher et al. | |
| 9,415,900 B2 | 8/2016 | O'Brien et al. | |
| 9,862,854 B2 | 1/2018 | O'Brien et al. | |
| 10,351,714 B2 | 7/2019 | Gibanel et al. | |
| 10,519,337 B2 | 12/2019 | Gibanel et al. | |
| 2002/0155235 A1 | 10/2002 | Taylor et al. | |
| 2003/0153676 A1 | 8/2003 | Brinkhuis et al. | |
| 2006/0100366 A1 | 1/2006 | O'Brien | |
| 2006/0256423 A1 | 11/2006 | Yamamoto et al. | |
| 2007/0043156 A1 | 2/2007 | Mestach et al. | |
| 2009/0014352 A1 | 1/2009 | Foden | |
| 2009/0143528 A1 | 6/2009 | Mestach et al. | |
| 2011/0244134 A1 | 10/2011 | Dombrowski et al. | |
| 2011/0244137 A1 | 10/2011 | Bober et al. | |
| 2012/0077030 A1 | 3/2012 | Gerst et al. | |
| 2012/0145721 A1 | 6/2012 | Cavallin et al. | |
| 2013/0316109 A1 | 11/2013 | Niederst et al. | |
| 2014/0076768 A1 | 3/2014 | Skillman et al. | |
| 2017/0029652 A1 | 2/2017 | O'Brien et al. | |
| 2019/0338144 A1 | 11/2019 | Gibanel et al. | |

FOREIGN PATENT DOCUMENTS

| | | | |
|---|---|---|---|
| CN | 101040016 A | 9/2007 | |
| CN | 100551983 C | 10/2009 | |
| CN | 102712727 A | 10/2012 | |
| EP | 0256391 A2 | 2/1988 | |
| EP | 0256500 A2 * | 2/1988 | C08F 259/06 |
| EP | 0308115 A2 | 3/1989 | |
| EP | 0379076 A2 | 7/1990 | |
| EP | 0389915 A1 | 10/1990 | |
| EP | 0747442 A2 | 12/1996 | |
| GB | 1421114 A | 1/1976 | |
| GB | 1513866 A | 6/1978 | |
| GB | 1555868 A | 11/1979 | |
| GB | 1574721 A | 9/1980 | |
| GB | 2060654 A | 5/1981 | |
| GB | 2397578 A | 7/2004 | |
| JP | S5339387 A | 4/1978 | |
| JP | H0543830 A | 2/1993 | |
| JP | 2000080212 A | 3/2000 | |
| JP | 2002155234 A | 5/2002 | |
| KR | 20130003024 A | 1/2013 | |
| WO | 8901498 A1 | 2/1989 | |
| WO | 198901498 A1 | 2/1989 | |
| WO | 2002026895 A1 | 4/2002 | |
| WO | 2002064691 A2 | 8/2002 | |
| WO | 2006045017 A1 | 4/2006 | |
| WO | 2010097353 A1 | 9/2010 | |
| WO | 2011009040 A1 | 1/2011 | |
| WO | 2012084973 A1 | 6/2012 | |
| WO | 2012089747 A1 | 7/2012 | |
| WO | 2012166488 A1 | 12/2012 | |
| WO | 2013079718 A1 | 6/2013 | |
| WO | 2014186285 A1 | 11/2014 | |
| WO | 2015002958 A1 | 1/2015 | |
| WO | 2015002961 A1 | 1/2015 | |

OTHER PUBLICATIONS

Asua et al., "Reactive surfactants in heterophase polymerization," Feature Article, Acta Polymerica, vol. 49, No. 12, Wiley Online Library, Dec. 1998, 16 pp.

Buckman et al., "Self-Crosslinking Polymeric Dispersants and Their Use in Emulsion Polymerisation," Proceedings of the Twenty-Ninth International Waterborne, High-Solids, & Powder Coatings Symposium, Feb. 6-8, 2002, 18 pp.

"Encyclopedia of Polymer Science and Technology," vol. 1, Wiley-Interscience, ISBN 0-471-28824-1, 2003, 34 pp. (Applicant points out, in accordance with MPEP 609.04(a), that the year of publication, 2003, is sufficiently earlier than the effective U.S. filing date, so that the particular month of publication is not in issue.).

Guerts et al., "Latexes with intrinsic crosslink activity," Progress in Organic Coatings, vol. 29, Nos. 1-4, Sep.-Dec. 1996, 9 pp.

Hebblethwaite., "Food can coating in falling IQ Scare," Packaging Week, vol. 13, Issue 2, May 15, 1997, 1 pp.

Hileman., "Bisphenol A: Regulatory, Scientific Puzzle," C&EN Washington, Chemical & Engineering News, vol. 75, No. 12, Mar. 24, 1997, 3 pp.

Ikezuki et al., "Determination of bisphenol A concentrations in human biological fluids reveals significant early prenatal exposure," Human Reproduction, vol. 17, No. 11, European Society of Human Reproduction and Embryology, Nov. 1, 2002, 3 pp.

Lee et al., "The Formation of 'Inverted' Core-Shell Latexes," Journal of Polymer Science: Polymer Chemistry Edition, vol. 21, No. 1, Jan. 1983, 8 pp.

Muroi et al., "Morphology of Core-Shell Latex Particles," Journal of Polymer Science: Polymer Chemistry Edition, vol. 22, No. 6, Jun. 1984, 8 pp.

Perez., "Study shows Nalgene bottles could prove dangerous," University Wire, University of Maryland, The Diamondback via U-Wire, Mar. 10, 2004, 2 pp.

Rubin et al., "Perinatal Exposure to Low Doses of Bisphenol A Affects Body Weight, Patterns of Estrous Cyclicity, and Plasma LH Levels," Environmental Health Perspectives, vol. 109, No. 7, Jul. 2001, 6 pp.

Schlarb et al., "Hydroresin dispersions: new emulsifier free binders for aqueous coatings," Progress in Organic Coatings, vol. 26, Issues 2-4, Sep.-Dec. 1995, 9 pp.

Turner et al., "Canmaking, The Technology of Metal Protection and Decoration," Blackie Academic & Professional, ISBN 0751403954, 1998, 66 pp. (Applicant points out, in accordance with MPEP 609.04(a), that the year of publication, 1998, is sufficiently earlier than the effective U.S. filing date, so that the particular month of publication is not in issue.).

Van de Ven et al., "Curing mechanisms and film properties of water-borne isocyanata-free all-acrylic coatings," Double Liaison, 1997, 5 pp. (Applicant points out, in accordance with MPEP 609.04(a), that the year of publication, 1997, is sufficiently earlier than the effective U.S. filing date, so that the particular month of publication is not in issue.).

Walsh, "Dangerous Baby Bottles? Scientists try to determine if clear plastics can do harm," The Patriot Ledger, Aug. 17, 1999, 4 pp.

Office Action and translation thereof, from counterpart Brazilian Application No. BR1120150328148, dated Dec. 10, 2019, 6 pp.

First Office Action and Search Report, and translation thereof, from counterpart Chinese Application No. 201480038131.7, dated Nov. 23, 2016, 11 pp.

Second Office Action, and translation thereof, from counterpart Chinese Application No. 201480038131.7, dated Jul. 31, 2017, 6 pp.

Examination Report from counterpart European Application No. 14747183.3, dated Jul. 2, 2019, 4 pp.

Response to Examination Report from counterpart European Application No. 14747183.3, dated Jul. 2, 2019, filed Jan. 13, 2020, 13 pp.

Communication pursuant to Rules 161(1) and 162 EPC from counterpart European Application No. 14747183.3, dated Feb. 12, 2016, 2 pp.

Response to Communication pursuant to Rules 161(1) and 162 EPC from counterpart European Application No. 14747183.3, dated Feb. 12, 2016, filed Aug. 18, 2016, 3 pp.

(56) References Cited

OTHER PUBLICATIONS

Summons to attend oral proceedings pursuant to Rule 115(1) EPC from counterpart European Application No. 14747183.3, dated Mar. 20, 2020, 7 pp.
The Notification of Preliminary Rejection, and translation thereof, from counterpart Korean Application No. 10-2016-7001337, dated Sep. 20, 2017, 13 pp.
International Search Report and Written Opinion of International Application No. PCT/US2014/045067, dated Nov. 26, 2014, 8 pp.
International Preliminary Report on Patentability from International Application No. PCT/US2014/045067, dated Jan. 14, 2016, 7 pp.
Response to Oral Proceedings including Main Request from European Patent Application No. 11808224.7, dated Dec. 14, 2017, filed Apr. 17, 2018, 48 pp.
Office Action from U.S. Appl. No. 16/508,755, dated Jan. 9, 2020, 6 pp.
Response to Office Action from U.S. Appl. No. 16/508,755, dated Jan. 9, 2020, filed Apr. 9, 2020, 9 pp.
Prosecution History from U.S. Appl. No. 14/902,501, dated Dec. 31, 2015 through Mar. 4, 2019, 47 pp.
Prosecution History from U.S. Appl. No. 14/902,546, dated Dec. 31, 2015 through Oct. 8, 2019, 114 pp.
U.S. Appl. No. 15/862,967 by Valspar Inc. (Inventor: Robert M. O'Brien), filed Jan. 5, 2018.
Notice of Allowance from U.S. Appl. No. 16/508,755, dated Jul. 9, 2020, 7 pp.
Notice of Intent to Grant and Text Intended to Grant from counterpart European Application No. 14747183.3 dated Aug. 30, 2021, 109 pp.
Extended Search Report from counterpart European Application No. 21213873.9 dated Mar. 17, 2022, 8 pp.

\* cited by examiner

COATING COMPOSITIONS FOR PACKAGING ARTICLES SUCH AS FOOD AND BEVERAGE CONTAINERS

CROSS REFERENCE TO RELATED MATTERS

This application is a continuation of U.S. patent application Ser. No. 14/902,546, filed Jul. 1, 2014, which is a national stage entry under 35 U.S.C. § 371 of PCT Application No. PCT/US2014/045067, filed Jul. 1, 2014, which claims the benefit of U.S. Provisional Application No. 61/842,044, filed Jul. 2, 2013. The entire contents of each of which are incorporated herein by reference.

FIELD

The present disclosure is directed to coating compositions. In particular, the present disclosure is directed to latex emulsion coating compositions, such as for forming coatings for food and beverage containers, as well as other packaging articles.

BACKGROUND

A wide variety of coatings have been used to coat the surfaces of packaging articles (e.g., food and beverage cans). For example, metal cans are sometimes coated using "coil coating" or "sheet coating" operations, i.e., a planar coil or sheet of a suitable substrate (e.g., steel or aluminum metal) is coated with a suitable composition and hardened (e.g., cured). The coated substrate then is formed into the can end or body. Alternatively, liquid coating compositions may be applied (e.g., by spraying, dipping, rolling, etc.) to the formed or partially formed article and then hardened (e.g., cured).

Packaging coatings should preferably be capable of high-speed application to the substrate and provide the necessary properties when hardened to perform in this demanding end use. For example, the coating should be safe for food contact, have excellent adhesion to the substrate, and resist degradation over long periods of time, even when exposed to harsh environments.

Many current packaging coatings contain mobile or bound bisphenol A ("BPA") or aromatic glycidyl ether compounds or PVC compounds. Although the balance of scientific evidence available to date indicates that the small trace amounts of these compounds that might be released from existing coatings does not pose any health risks to humans, these compounds are nevertheless perceived by some people as being potentially harmful to human health. From the foregoing, it will be appreciated that what is needed in the art is a packaging container (e.g., a food or beverage can) that is coated with a composition that does not contain extractible quantities of such compounds.

SUMMARY

An aspect of the present disclosure is directed to an article, comprising a packaging article such as a food or beverage container, or a portion thereof. The article includes a substrate, more preferably a metal substrate, and a coating disposed on at least a portion of the substrate. The coating is formed from a coating composition having a latex emulsion that is a reaction product of a method. The method preferably includes emulsion polymerizing first-stage monomers in an aqueous carrier to produce a first-stage copolymer having a high molecular weight (e.g., a number-average molecular weight greater than about 50,000). The first-stage monomers preferably include at least 3% by weight of and comprising step-growth-functional monomers having step-growth-functional groups, based on an entire weight of the first-stage monomers groups. The method also includes emulsion polymerizing a plurality of second-stage monomers in the presence of the first-stage copolymer to form a second-stage copolymer, where the second-stage copolymer includes a curing group configured to react with one of the step-growth-functional groups of the first-stage copolymer during a curing step. Preferably, the coating composition is substantially free of one or more of structural units derived from (meth)acrylamide-type monomers and bisphenol A.

Another aspect of the present disclosure is directed to a method of making an inside spray coating composition for use with food or beverage containers. The method includes emulsion polymerizing first-stage monomers including one or more polymerizable surfactant monomers in an aqueous carrier to produce a first-stage copolymer having a high molecular weight (e.g., a number-average molecular weight greater than about 50,000), and where the first-stage copolymer includes water-dispersing groups. The method also includes emulsion polymerizing second-stage monomers in the presence of the first-stage copolymer to form a second-stage copolymer, where the second-stage copolymer includes a curing group configured to react with the first-stage copolymer during a curing step. The method also preferably includes formulating the coating composition to provide a viscosity for a spray-coating application.

Another aspect of the present disclosure is directed to a method of forming a coating on a food or beverage container, or portion thereof. The method includes providing a coating composition having an emulsion polymerized latex, where at least a portion of the latex includes a first-stage emulsion polymerized latex copolymer comprising at least 3% by weight of monomer units having step-growth-functional group, and a second-stage emulsion polymerized latex copolymer comprising curing groups (e.g., oxirane groups). The method also includes spraying the provided coating composition onto an interior surface of the food or beverage container, and heating the sprayed coating composition to cure the coating composition, thereby providing the coating on the interior surface of the food or beverage container.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

As used herein, the term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

The term "aryl group" (e.g., an arylene group) refers to a closed aromatic ring or ring system such as phenylene, naphthylene, biphenylene, fluorenylene, and indenyl, as well as heteroarylene groups (i.e., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.).

A group that may be the same or different is referred to as being "independently" something.

Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The terms "a", "an", "the", "at least one," and "one or more" are used interchangeably. Thus, for example, reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyester is interpreted to include one or more polymer molecules of the polyester, where the polymer molecules may or may not be identical (e.g., different molecular weights, isomers, etc. . . . ).

The term "substantially free" of a particular compound means that the compositions of the present disclosure contain less than 100 parts per million (ppm) of the recited compound. The term "essentially free" of a particular compound means that the compositions of the present disclosure contain less than 10 ppm of the recited compound. The term "essentially completely free" of a particular compound means that the compositions of the present disclosure contain less than 1 ppm of the recited compound. The term "completely free" of a particular compound means that the compositions of the present disclosure contain less than 20 parts per billion (ppb) of the recited compound.

The term "food-contact surface" refers to the substrate surface of a container (typically an inner surface of a food or beverage container) that is in contact with, or intended for contact with, a food or beverage product. By way of example, an interior surface of a metal substrate of a food or beverage container, or a portion thereof, is a food-contact surface even if the interior metal surface is coated with a polymeric coating composition.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers). Similarly, unless otherwise indicated, the use of a term designating a polymer class such as, for example, "acrylic" is intended to include both homopolymers and copolymers (e.g., polyester-acrylic copolymers).

The terms "comprises" and variations thereof do not have a limiting meaning where these terms appear in the description and claims.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

Figure 1:
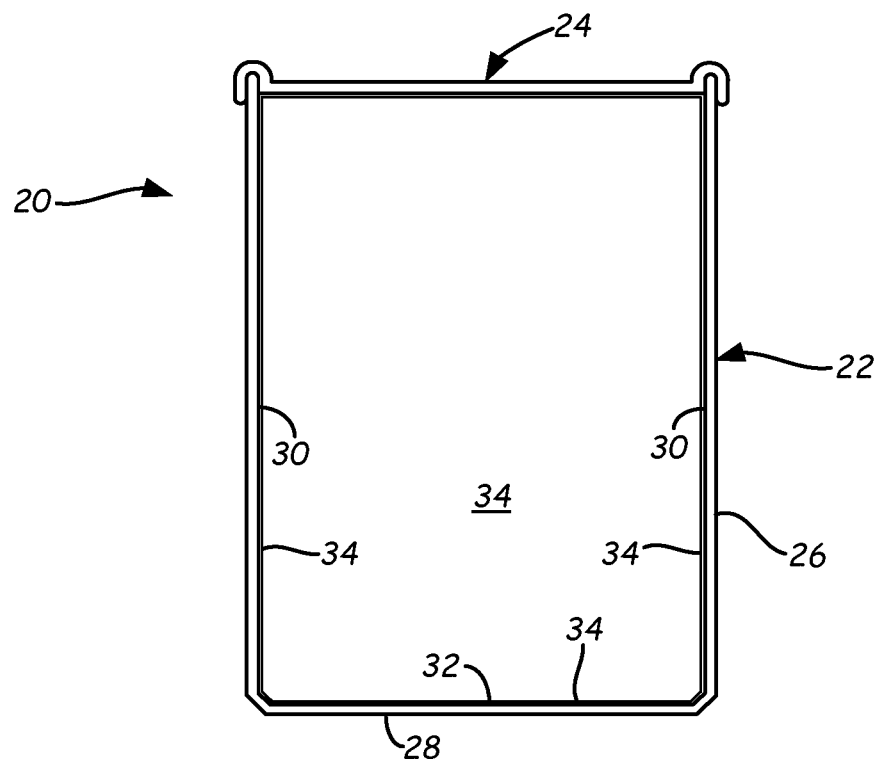
FIG. 1 is a schematic illustration of a two-piece food or beverage container having a coating formed from the coating composition of the present disclosure.

The present disclosure is directed to a latex copolymer, and a related coating composition for use in forming products, such as coatings on substrates. For example, the coating composition may be used to form coatings on metal substrates for containers of food and beverage products (or other packaged products), and methods for producing the coating composition. The present disclosure is also directed to containers having coatings formed from the coating composition, and related methods of application.

The coating composition of the present disclosure includes a latex emulsion, and may optionally be further formulated to include one or more additional additives. The coating composition may also optionally be rheologically modified for different coating applications (e.g., diluted or otherwise configured for spray coating applications).

The latex emulsion of the coating composition preferably includes copolymers that are polymerized in multiple separate emulsion polymerization stages. In some embodiments, one or more polymerizable surfactant monomers are used. As discussed below, the resulting coating composition is believed to produce cured coatings having a desirable balance of coating properties, including good corrosion resistance, flexibility, and durability, rendering the coating composition particularly suitable for forming coatings that can be used in a variety of different products (e.g., packaging containers for food and beverage products). In fact, the coating composition is particularly suitable for use in a spray coating applications to coat interior surfaces of containers for food and beverage products, including food and beverage products that are chemically aggressive.

The latex emulsion is preferably produced in a multiple-stage process, which may be based on an inverted core-shell polymerization process in which it is believed that portions of the latex particle which tend to associate towards the outside of the particle are formed prior to portions that tend to associate towards the interior of the particle, and which is discussed in more detail below. Briefly, in preferred embodiments, the first-stage polymerization preferably involves emulsion polymerizing first-stage monomers (optionally including one or more polymerizable and/or non-polymerizable surfactant monomers) in an aqueous carrier to produce first-stage copolymers. This is believed to produce copolymers having higher molecular weights (as compared, e.g., to solution polymerized copolymers). Alternatively, polymers that were formed in organic solution prior to dispersal in the aqueous carrier may be employed (e.g., solution polymerized acrylic, polyester, alkyd, and/or polyurethane polymers or copolymers thereof).

From there, a second-stage emulsion polymerization may be conducted, where second-stage monomers may be emulsion polymerized in the presence of the first-stage copolymers. Additionally, the second stage copolymers may include curing groups, which are preferably functional groups that compliment and graft to step-growth functional groups of the first-stage copolymers during a subsequent curing step, preferably via a step-growth reaction. This forms cured linkages, which can crosslink the first-stage copolymers and the second-stage copolymers, during coating cure.

The latex emulsion produced from the above-discussed process may then be optionally further formulated and/or modified for different coating applications, thereby producing the coating composition of the present disclosure. The coating composition may then be applied to a metal substrate (or other suitable substrate), either before or after the substrate is formed into a food or beverage container (e.g., two-piece cans, three-piece cans) or a portion thereof (e.g., a food can or beverage can end), whether it be a can end or can body. The applied coating composition may then be cured on the metal substrate to produce a coating.

The following is an example of a two-stage polymerization process (which may optionally include one or more additional stages) for producing the latex emulsion, for formulating a coating composition therefrom, and for forming cured coatings therefrom. In some embodiments, the polymerization process may function in a core-shell polymerization reaction, such as an inverse core-shell reaction where the first-stage copolymers form a shell portion and the second-stage copolymers form a core portion.

Additionally, prior to the first-stage polymerization, the multi-stage polymerization process may include one or more seed polymerization stages to form polymerized seeds from seed monomers. Examples of suitable seed monomers include those discussed below for the first-stage monomers. More preferably, less than about 10% by weight of the overall latex copolymer is formed by seed polymerization stage(s), even more preferably less than about 5% by weight, and even more preferably less than about 1% by weight. In some embodiments, substantially none of the overall latex copolymer is formed by seed polymerization stage(s).

During the first-stage polymerization, first-stage monomers may be dispersed or otherwise suspended in an aqueous carrier. In preferred embodiments, the first-stage polymerization may be an emulsion polymerization process that produces first-stage copolymers from the first-stage monomers dispersed in the aqueous carrier, optionally with the use of one or more surfactants. Preferred first-stage copolymers are capable of facilitating emulsification and/or polymerization of the second stage monomers.

The first-stage monomers preferably include a mixture of monomers capable of polymerizing under free radical-initiated emulsion polymerization conditions, such as monomers having ethylenically-unsaturated groups. Specific examples of suitable monomers having ethylenically-unsaturated groups include (meth)acrylate monomers, ethylenically-unsaturated monomers having at least one functional group capable of participating in a step-growth reaction (referred to herein as "step-growth functional monomers"), ethylenically-unsaturated aromatic monomers, ethylenically-unsaturated polymerizable surfactants, and mixtures thereof.

In certain preferred embodiments, the first-stage copolymer includes water-dispersing groups (e.g., salt or salt-forming groups) and more preferably a sufficient amount of water-dispersing groups so that the first-stage copolymer can function as a polymeric surfactant to facilitate the emulsion polymerization of the second-stage monomers.

Suitable (meth)acrylates for the first-stage monomers include those having the following structure:

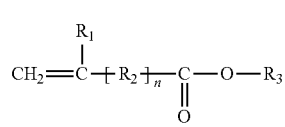

(Formula 1)

where group $R_1$ may be a hydrogen atom or an organic group, such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independent group $R_1$. Groups $R_2$ and $R_3$ may each independently be any suitable organic group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example. The integer "n" may be zero or one, more preferably zero such that group $R_2$ is omitted and the ester (—COO$R_3$) group extends directly from the unsaturated group.

Specific examples of suitable (meth)acrylates encompass alkyl (meth)acrylates, which are preferably esters of acrylic or methacrylic acid. Examples of suitable alkyl (meth)acrylates include methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, benzyl (meth)acrylate, lauryl (meth)acrylate, isobornyl (meth)acrylate, octyl (meth)acrylate, nonyl (meth)acrylate, hydroxyethyl acrylate (HEA), hydroxyethyl methacrylate (HEMA), hydroxypropyl (meth)acrylate (HPMA), and mixtures thereof. Difunctional (meth)acrylate monomers may be used in the monomer mixture as well. Examples include ethylene glycol di(meth)acrylate, 1,6-hexanediol di(meth)acrylate, allyl methacrylate, and the like.

The one or more (meth)acrylates may constitute greater than about 5%, more preferably greater than about 10%, and even more preferably greater than about 20% by weight of the first-stage monomers used to produce the first-stage copolymers. The (meth)acrylates may also constitute less than about 70%, more preferably less than about 50%, and even more preferably less than about 30% by weight of the first-stage monomers used to produce the first-stage copolymers.

Examples of suitable ethylenically-unsaturated step-growth-functional monomers include ethylenically-unsaturated acid-functional monomers having at least one functional group capable of participating in a step-growth reaction, ethylenically-unsaturated alcohol-functional monomers, ethylenically-unsaturated amine-functional monomers, and ethylenically-unsaturated amide-functional monomers, and mixtures thereof. Preferably, the ethylenically-unsaturated step-growth-functional monomers are ethylenically-unsaturated acid-functional monomers, which may be included to provide acid functional groups to the resulting first-stage copolymers. As discussed below, the acid functional groups may assist in water dispersibility (e.g., via neutralization) and may also provide step-growth reaction sites during the curing steps.

Examples of suitable ethylenically-unsaturated acid-functional monomers include ethylenically-unsaturated carboxylic acid monomers, anhydrides thereof, salts thereof, and mixtures thereof. Illustrative ethylenically-unsaturated carboxylic acid monomers include those represented by the following structure:

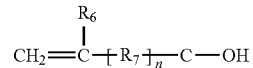
(Formula 2)

where the group $R_4$ may be a hydrogen atom or an organic group, such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independent group $R_4$. Group $R_5$ may be any suitable divalent group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example. The integer "n" may be zero or one, more preferably zero such that group $R_5$ is omitted and the carboxyl (—COOH) group extends directly from the unsaturated group.

Examples of suitable ethylenically-unsaturated carboxylic acid monomers include acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, and mixtures thereof. Preferred ethylenically-unsaturated carboxylic acid monomers include acrylic acid, methacrylic acid, crotonic acid, fumaric acid, maleic acid, 2-methyl maleic acid, itaconic acid, 2-methyl itaconic acid, and mixtures thereof.

Examples of suitable ethylenically-unsaturated anhydride monomers include compounds derived from the above-discussed ethylenically-unsaturated carboxylic acid monomers (e.g., as pure anhydride or mixtures of such). Preferred ethylenically-unsaturated anhydrides include acrylic anhydride, methacrylic anhydride, and maleic anhydride. If desired, aqueous salts of the above ethylenically-unsaturated carboxylic acid monomers may also be employed.

Examples of suitable ethylenically-unsaturated alcohol-functional monomers include monomers having ethylenically-unsaturated groups and one or more alcohol (—COH) groups. Illustrative alcohol-functional monomers include those represented by the following structure:

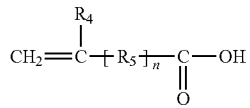
(Formula 3)

where the group $R_6$ may be a hydrogen atom or an organic group, such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independent group $R_6$. Group $R_7$ may be any suitable divalent group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example. The integer "n" may be zero or one, more preferably zero such that group $R_7$ is omitted and the alcohol (—COH) group extends directly from the unsaturated group.

In some embodiments, the first-stage monomers may also include ethylenically-unsaturated amine-functional monomers and/or ethylenically-unsaturated amide-functional monomers, such as those having one or more vinyl groups and one or more amine and/or amide groups. Preferably, the amide functional groups undergo hydrolysis after the first-stage polymerization to produce amine-functional groups for the first-stage copolymers.

These monomers may provide amine-functional groups that can react with some embodied curing monomers (e.g., cyclocarbonates) using a step-growth reaction, during the subsequent curing step. The concentration ranges of the ethylenically-unsaturated amine-functional monomers and ethylenically-unsaturated amide-functional monomers are preferably included in the above-discussed collective concentrations of the ethylenically-unsaturated acid-functional monomers and the ethylenically-unsaturated alcohol-functional monomers. However, in some embodiments, the coating composition of the present disclosure is substantially free or completely free of amide-functional materials (e.g., acrylamides).

The ethylenically-unsaturated step-growth-functional monomers may collectively constitute greater than about 5%, more preferably greater than about 10%, and even more preferably greater than about 20% by weight of the first-stage monomers used to produce the first-stage copolymers. The ethylenically-unsaturated step-growth-functional monomers may also collectively constitute less than about 50%, more preferably less than about 40%, even more preferably less than about 35%, and even more preferably less than about 30% by weight of the first-stage monomers used to produce the first-stage copolymers.

As mentioned above, at least some (and optionally all) of the ethylenically-unsaturated step-growth-functional monomers are preferably ethylenically-unsaturated acid-functional monomers. As such, preferred weight ranges for the ethylenically-unsaturated acid-functional monomers relative to the first-stage monomers used to produce the first-stage copolymers include those discussed above for the ethylenically-unsaturated step-growth-functional monomers. In some embodiments, the ethylenically-unsaturated step-growth-functional monomers include both acid-functional monomers and monomers having other functional groups (e.g., —OH, —NCO, —NH$_2$, oxirane, etc. . . . ).

Suitable ethylenically-unsaturated aromatic monomers include monomers having aromatic groups and ethylenically-unsaturated groups (e.g., aromatic vinyl monomers). Examples of suitable ethylenically-unsaturated aromatic monomers include styrene, methyl styrene, halostyrene, diallylphthalate, divinylbenzene, alpha-methylstyrene, vinyl toluene, vinyl naphthalene, and mixtures thereof. Styrene is a presently preferred vinyl monomer, in part due to its relatively low cost. However, in some embodiments, the first-stage monomers may be substantially free or completely free of styrene.

The ethylenically-unsaturated aromatic monomers may constitute greater than about 20%, more preferably greater than about 30%, even more preferably greater than about 40%, and even more preferably greater than about 45% by weight of the first-stage monomers used to produce the first-stage copolymers. The ethylenically-unsaturated aromatic monomers may also constitute less than about 70%, more preferably less than about 60%, and even more preferably less than about 55% by weight of the first-stage monomers used to produce the first-stage copolymers.

As can be appreciated, some of the above-described monomers may fall within multiple monomer categories. For example, some of the monomers may qualify as both a meth(acrylate) monomer and an ethylenically-unsaturated aromatic monomer, such as benzyl (meth)acrylate. Similarly, others of the monomers may qualify as both an ethylenically-unsaturated acid-functional monomer and an ethylenically-unsaturated aromatic monomer, such as cinnamic acid. In these situations, unless expressly stated otherwise, the above-discussed concentration ranges for the ethylenically-unsaturated aromatic monomers encompasses all aromatic monomers of the first-stage monomers, including those that also qualify as meth(acrylate) monomers, ethylenically-unsaturated acid-functional monomers, and/or ethylenically-unsaturated alcohol-functional monomers.

The one or more surfactant monomers (which may be polymerizable or non-polymerizable) may assist in dispersing the first-stage monomers in the aqueous carrier, as well as optionally polymerizing with each other and/or the above-discussed first-stage monomers to form chain segments of the first-stage copolymers and/or with subsequent stage monomers. The surfactant monomers preferably include hydrophobic and hydrophilic portions. The polymerizable surfactant monomers are preferably capable of polymerizing under free radical-initiated polymerization conditions, such as surfactant monomers having ethylenically-unsaturated groups (e.g., (meth)acrylic-based polymerizable surfactant monomers). Examples of polymerizable surfactant monomers for use in the latex emulsion may include those having one or more hydrophobic portions, one or more hydrophilic portions, and one or more ethylenically-unsaturated group may be located at the hydrophobic portion, at the hydrophilic portion, or in-between.

The hydrophobic portion(s) may be any suitable substituted or unsubstituted hydrocarbon chain, such as a substituted or unsubstituted alkyl or alkenyl group, a substituted or unsubstituted cyclic hydrocarbon group, a substituted or unsubstituted aromatic hydrocarbon group, and combinations thereof. The hydrophobic portion preferably include one or more non-polar groups, such as one or more aromatic groups.

The hydrophilic portion(s) may be any suitable substituted or unsubstituted hydrocarbon chain, such as a substituted or unsubstituted alkyl or alkenyl chain, optionally with one or more ether linkages, which terminates in a polar group. The polar group may include one or more hydroxyl groups, acid groups (e.g., carboxylic acid groups), sulfonate groups, sulfinate groups, sulfate groups, phosphate groups, phosphinate groups, phosphonate groups, salt derivatives thereof, and combinations thereof.

Examples of suitable polymerizable surfactant monomers include those disclosed in U.S. Publication No. 2002/0155235; and those commercially available under the tradename "REASOAP" from Adeka Corporation, Tokyo, Japan, under the tradenames "NOIGEN" and "HITENOL" from Da-Ichi Kogyo Siyyaku Co., Ltd., Tokyo, Japan; and under the tradename "SIPOMER" from Solvay Rhodia, Brussels, Belgium. In embodiments that include polymerizable surfactant monomers, the polymerizable surfactant monomers may constitute greater than about 0.1%, more preferably greater than about 0.5%, and even more preferably greater than about 1% by weight of the first-stage monomers used to produce the first-stage copolymers. The polymerizable surfactant monomers may also constitute less than about 15%, more preferably less than about 10%, and even more preferably less than about 5% by weight of the first-stage monomers used to produce the first-stage copolymers.

More preferably, the first-stage monomers include a combination of one or more: (meth)acrylate monomers, one or more ethylenically-unsaturated acid-functional monomers, one or more ethylenically-unsaturated aromatic monomers, and one or more polymerizable surfactant monomers.

A first particularly suitable combination of first-stage monomers includes one or more non-aromatic (meth)acrylates, one or more (meth)acrylic acids, one or more vinyl aromatic monomers, and optionally one or more ethylenically-unsaturated polymerizable surfactant monomers. In this first particularly suitable combination, the non-aromatic (meth)acrylates may constitute from about 5% to about 40% by weight, and more preferably from about 15% to about 30% by weight; the (meth)acrylic acids may constitute from about 15% to about 40% by weight, and more preferably from about 20% to about 30% by weight; the vinyl aromatic monomers may constitute from about 35% to about 65% by weight, and more preferably from about 45% to about 55% by weight; and the optional ethylenically-unsaturated polymerizable surfactant monomer may constitute from 0% to about 10% by weight, and more preferably from about 1% to about 5% by weight; based on the entire weight of the first-stage monomers used to produce the first-stage copolymers.

A second particularly suitable combination of first-stage monomers includes one or more non-aromatic (meth)acrylates, one or more (meth)acrylic acids, one or more aromatic (meth)acrylates, and optionally one or more ethylenically-unsaturated polymerizable surfactant monomers, and is substantially free of styrene. This embodiment illustrates an example coating composition that is substantially free of styrene, where the aromatic functionality is obtained with one or more aromatic (meth)acrylates (e.g., benzyl methacrylate).

In this second particularly suitable combination, the non-aromatic (meth)acrylates may constitute from about 5% to about 30% by weight, and more preferably from about 15% to about 25% by weight; the (meth)acrylic acids may constitute from about 10% to about 40% by weight, and more preferably from about 15% to about 30% by weight; the aromatic (meth)acrylates may constitute from about 40% to about 70% by weight, and more preferably from about 50% to about 65% by weight; and the optional ethylenically-unsaturated polymerizable surfactant monomers may constitute from 0% to about 10% by weight, and more preferably from about 1% to about 5% by weight; based on the entire weight of the first-stage monomers used to produce the first-stage copolymers.

The aqueous carrier may include water, and optionally, one or more organic solvents. Examples of suitable organic solvents for use in the aqueous carrier may include methanol, ethanol, isopropyl alcohol, butyl alcohols (e.g., n-butanol and buytl glycol), 2-butoxyethanol, 2-(2-butoxyethoxy) ethanol (i.e., butyl carbitol), aromatic solvents, isophorones, glycol ethers, glycol ether acetates, acetone, methyl-ethyl ketones (MEK), N,N-dimethylformamides, ethylene carbonates, propylene carbonates, diglymes, N-methylpyrrolidones (NMP), ethyl acetates, ethylene diacetates, propylene glycol diacetates, alkyl ethers of ethylene, propylene glycol monoacetates, toluene, xylenes, and combinations thereof.

Optionally, one or more non-polymerizable surfactants may also be used (i.e., alone or in combination with one or more polymerizable surfactants), such as surfactants that can support emulsion polymerization reactions. For example, the non-polymerizable surfactant(s) may include surfactants containing sulfonate groups, sulfate groups, phosphate groups, phosphinate groups, phosphonate groups, and combinations thereof; as well as ethoxylated surfactants. An example of a non-polymerizable surfactant includes dodecylbenzene sulfonic acid and sulfonates thereof (e.g., dodecylbenzene sulfonate salts, and particularly amine-neutralized salts).

The concentration of non-polymerizable surfactants may vary depending on the types and concentrations of the monomers used during the first-stage polymerization, including the polymerizable surfactant monomers. In embodiments that include non-polymerizable surfactants, the non-polymerizable surfactants may constitute greater than about 0.01%, more preferably greater than about 0.05%, and even more preferably greater than about 0.1% by weight, relative to a total weight of the first-stage monomers. The non-polymerizable surfactants may also constitute less than about 10%, more preferably less than about 7%, and even more preferably less than about 5% by weight, relative to the total weight of the first-stage monomers.

The surfactants used herein are preferably non-long-chain-polymer surfactants, such as polymerizable surfactant monomers and/or non-polymerizable surfactants having molecular weights less than about 2,000, and more preferably less than about 1,000.

In alternative embodiments, the first-stage polymerization may be performed as an emulsion polymerization process without the use of any polymerizable or non-polymerizable surfactants. Some extra stabilization of the latex is thought to be due to the incorporation in the polymer of ionic species coming from the initiators. For example, some persulphate-based initiators, such as ammonium persulphate, may function as stabilizers of the latex.

In these embodiments, the dispersant compounds are preferably used in concentrations greater than about 0.01%, more preferably greater than about 0.1%, and even more preferably greater than about 0.3% by weight, relative to the total weight of the first-stage monomers. The initiator and accelerator are also preferably used in concentrations less than about 10%, more preferably less than about 5%, and even more preferably less than about 3% by weight, relative to the total weight of the first-stage monomers.

For an emulsion polymerization process conducted during the first-stage polymerization, the one or more surfactants (or alternative dispersant compounds) may be initially dispersed in the aqueous carrier, which is preferably accompanied by agitation of the aqueous carrier. Additionally, the resulting surfactant dispersion is preferably heated to assist in the subsequent polymerization reactions. Preferred temperatures for heating the surfactant dispersion include temperatures greater than about 65° C., and more preferably from about 70° C. to about 90° C. The pH of the dispersion may be maintained at any suitable level, such as from about 5 to about 12. The first-stage monomers and the one or more surfactants may be added to the reaction mixture at any suitable time relative to one another—e.g., simultaneous addition, the addition of surfactant prior to the addition of monomer, and/or the addition of surfactant after the addition of monomer.

When the aqueous dispersion reaches the desired temperature, the remaining first-stage monomers may be introduced to the dispersion. The first-stage monomers may be added incrementally or continuously to the aqueous dispersion over time. Alternatively, in certain embodiments a batch or semi-batch process may be used to polymerize the first-stage monomers in the aqueous dispersion, as described in O'Brien et al., U.S. Pat. No. 8,092,876.

One or more polymerization initiators may also be added to the aqueous dispersion (e.g., along with the first-stage monomers) to initiate the first-stage polymerization. Suitable polymerization initiators include free-radical initiators, such as one or more peroxides and/or persulfates and similar compounds. Examples of suitable peroxides include hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates; and mixtures thereof. Azoic compounds can also be used to generate free radicals such as 2,2'-azo-bis(isobutyronitrile), 2,2'-azo-bis(2,4-dimethylvaleronitrile), and 1-t-butyl-azocyanocyclohexane, and mixtures thereof. Examples of suitable persulfates include persulfates of ammonium or alkali metal (potassium, sodium or lithium). Perphosphates can be also a source of free radicals, and mixtures thereof.

Polymerization initiators can be used alone or as the oxidizing component of a redox system, which also typically includes a reducing component such as ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, ferrous complexes (e.g., ferrous sulphate heptahydrate), and mixtures thereof. The reducing component is frequently referred to as an accelerator or a catalyst activator.

The initiator and accelerator (if used) are preferably each used in concentrations greater than about 0.001%, more preferably greater than about 0.1%, and even more preferably greater than about 1% by weight, relative to the total weight of the first-stage monomers. The initiator and accelerator (if used) are also each preferably used in concentrations less than about 10%, more preferably less than about 7%, and even more preferably less than about 5% by weight, relative to the total weight of the first-stage monomers.

Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe (II), and ammonium persulfate/sodium bisulfate/sodium hydrosulfite/Fe(II).

The first stage polymerization may continue for a suitable duration to polymerize the first-stage monomers with a free-radical initiated polymerization process. This produces the first-stage copolymers, which may be linear, branched, or combinations thereof.

In preferred embodiments, due to the inclusion of the ethylenically-unsaturated step-growth-functional monomers, at least some, and more preferably substantially each of the first-stage copolymers have one or more step-growth-functional groups, such as one or more acid-functional groups (e.g., pendant carboxylic acid groups and/or anhydride groups), one or more alcohol-functional groups, and/or one or more amine-functional groups. As discussed below, in some embodiments, at least a portion of these step-growth-functional groups may subsequently react with the curing groups of the second-stage copolymers during a curing step and/or function as water dispersing groups (e.g., when neutralized).

In embodiments in which the first-stage copolymer includes acid-functional step-growth-functional monomers, after the first-stage polymerization is completed, at least a portion of the carboxylic acid groups and/or anhydride groups of the first-stage copolymers may be neutralized or partially neutralized with a suitable basic compound to produce water-dispersing groups. Alternatively (or additionally), in some embodiments, one or more the first-stage monomers may be pre-neutralized prior to the first-stage polymerization.

The basic compound used for neutralization is preferably a fugitive base, more preferably an amine fugitive base (e.g., primary, secondary, and/or tertiary amines), with tertiary amines being particularly preferred. Some examples of suitable tertiary amines are trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Triethyl amine and dimethyl ethanol amine are preferred tertiary amines.

The degree of neutralization required may vary considerably depending upon the amount of acid or base groups included in the first-stage copolymers, and the degree of dispersibility that is desired. In embodiments in which neutralized acid groups are used for water dispersibility, preferred acid numbers for the first-stage copolymer prior to neutralization include acid numbers greater than about 40, more preferably greater than about 80, and even more preferably greater than about 100 milligrams (mg) potassium hydroxide (KOH) per gram of the first-stage copolymer. Preferred acid numbers for the first-stage copolymer prior to neutralization also include acid numbers less than about 400, more preferably less than about 350, and even more preferably less than about 300 mg KOH per gram of the first-stage copolymer. Acid numbers referred to herein may be calculated pursuant to BS EN ISO 3682-1998 standard, or alternatively may be theoretically determined based on the reactant monomers.

Typically, to render the first-stage copolymers water-dispersible, at least 25% of the acid groups of the first-stage copolymers are neutralized, preferably at least 30% are neutralized, and more preferably at least 35% are neutralized. Preferably, the first-stage copolymers include a sufficient number of water-dispersing groups to form a stable dispersion in the aqueous carrier. Furthermore, in embodiments incorporating polymerizable surfactant monomer and/or other surfactant, the hydrophilic portions of the surfactant may also assist in dispersing the first-stage copolymers in the aqueous carrier.

While the first-stage copolymers have been primarily described herein with acid-based water-dispersing groups that are neutralized with basic compounds, in alternative embodiments, the water-dispersing groups may be basic groups that are neutralized with acidic compounds. Examples of suitable basic groups for this embodiment include those disclosed in O'Brien et al., U.S. Pat. No. 8,092,876. Examples of suitable acidic neutralizing compounds include formic acid, acetic acid, hydrochloric acid, sulfuric acid, and mixtures thereof.

Preferred number-average molecular weights for the first-stage copolymer in this emulsion-polymerized embodiment include those greater than about 50,000, more preferably greater than about 100,000, even more preferably greater than about 500,000, and even more preferably greater than about 1,000,000.

Preferred glass transition temperatures for the first-stage copolymer in this emulsion-polymerized embodiment include those greater than about 40° C., more preferably greater than about 45° C., even more preferably greater than about 50° C., and most preferably greater than about 60° C. Preferred glass transition temperatures for the first-stage copolymer in this emulsion-polymerized embodiment include those less than about 120° C., more preferably less than about 100° C., even more preferably less than about 90° C., and even more preferably less than about 80° C. The glass transition temperatures referred to herein are theoretically calculated pursuant to the Flory-Fox Equation.

After the first-stage polymerization is completed, the second stage polymerization may be conducted to produce the second-stage copolymers. As discussed above, this may be performed with an inverse core-shell arrangement, where the first-stage copolymers generally define an outer portion of the latex emulsion and the second-stage copolymers generally define a core of the late emulsion inside of the shell.

In some embodiments, the first and second stage polymerizations may at least partially overlap. For example, the second-stage polymerization may start after at least about 50% by weight of the first-stage monomers are polymerized, more preferably after at least about 75% by weight, and even more preferably after at least about 90% by weight. In some embodiments, the second-stage polymerization may start after the first-stage polymerization is completed.

The second-stage polymerization may initially involve adding second-stage monomers and a suitable polymerization initiator to the aqueous dispersion containing the first-stage copolymers (which are preferably at least partially neutralized), where examples of suitable polymerization initiators and their concentrations for the second-stage polymerization include those discussed above for the first-stage polymerization.

The second-stage monomers may include the same types of ethylenically-unsaturated monomers as used for the first-stage monomers, such as one or more (meth)acrylate monomers, optionally one or more of ethylenically-unsaturated step-growth-functional monomers, and optionally one or more ethylenically-unsaturated aromatic monomers. Such ethylenically-unsaturated monomers for the second-stage monomers include those discussed above for the first-stage monomers. In preferred embodiments, the second-stage monomers are, when considered overall, more hydrophobic relative to those of the first-stage copolymer.

Furthermore, in some preferred embodiments, the second-stage monomers are chemically different from the first-stage monomers, such that the second-stage copolymer is chemically different from the first-stage copolymer. For example, at least about 5%, more preferably at least about 10% by weight of the first-stage monomers are different than the second-stage monomers.

The (meth)acrylate monomers may constitute greater than about 5%, more preferably greater than about 10%, and even more preferably greater than about 15% by weight of the second-stage monomers used to produce the second-stage copolymers. (Meth)acrylate monomers may also constitute less than about 55%, more preferably less than about 40%, and even more preferably less than about 35% by weight of the second-stage monomers used to produce the second-stage copolymers.

In some preferred embodiments, the second-stage monomers are substantially free of ethylenically-unsaturated step-growth-functional monomers (e.g., substantially free of ethylenically-unsaturated acid-functional monomers). Instead, the second-stage monomers preferably include one or more curing monomers, which may undergo step-growth reactions during a subsequent curing step to form a cured coating.

The curing monomer preferably includes at least two different functional groups. The first functional group of the curing monomer preferably compliments the step-growth-functional groups of the first-stage copolymers (e.g., the acid-, alcohol-, and amine-functional groups), thereby allowing the first functional group to react with one of the step-growth-functional groups via a step-growth reaction (i.e., during a subsequent curing step). Examples of preferred groups for the first functional group of the linkage monomer include oxirane groups, isocyanate groups, azlactone groups, oxazoline groups, cyclocarbonate groups, and the like.

In comparison, the second functional group of the curing monomer is preferably configured to react with the second-stage monomers. Accordingly, examples of preferred groups for the second functional group include ethylenically-unsaturated groups, such as vinyl groups.

In some preferred embodiments, the first functional group is an oxirane group, such as in an oxirane-containing ethylenically-unsaturated monomers. Examples of suitable curing monomers containing oxirane groups include glycidyl esters of alpha, beta-unsaturated acids, or anhydride thereof (e.g., an oxirane group-containing alpha, beta-ethylenically unsaturated monomer). Suitable alpha, beta-unsaturated acids include monocarboxylic acids or dicarboxylic acids. Examples of such carboxylic acids include acrylic acid, methacrylic acid, alpha-chloroacrylic acid, alpha-cyanoacrylic acid, beta-methylacrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-stearylacrylic acid, itaconic acid, citraconic acid, mesaconic acid, glutaconic acid, aconitic acid, maleic acid, fumaric acid, tricarboxyethylene, maleic anhydride, and mixtures thereof.

Specific examples of suitable curing monomers containing a glycidyl group are glycidyl (meth)acrylate (e.g., glycidyl methacrylate and glycidyl acrylate), mono- and di-glycidyl itaconate, mono- and di-glycidyl maleate, and mono- and di-glycidyl formate. A preferred linkage monomer is glycidyl methacrylate ("GMA").

In other embodiments, the first functional group may be an isocyanate group. In these embodiments, examples of suitable curing monomers include ethylenically-unsaturated isocyanate monomers, such as vinyl isocyanates (e.g., isopropenyl dimethylbenzyl isocyanate from Cytec Industries, Inc., Woodland Park, N.J.). The isocyanate groups preferably compliment first-stage copolymers having acid-functional groups and/or alcohol-functional groups, more preferably alcohol-functional groups, which can undergo step-growth reactions with the isocyanate groups.

In further embodiments, the first functional group may be an azlactone or an oxazoline group. In these embodiments, examples of suitable curing monomers include ethylenically-unsaturated azlactone monomers (e.g., vinyl azlactones, such as those available from Isochem SAS, 3 Rue Lavoisier, 91710-Vert le Petit, France) and ethylenically-unsaturated oxazoline monomers (e.g., vinyl oxazolines, such as those available from Sigma Aldrich). The azlactone and oxazoline groups preferably compliment first-stage copolymers having acid-functional groups, which can undergo step-growth reactions with the azlactone groups or the oxazoline groups.

In other embodiments, the first functional group may be an cyclocarbonate group. In these embodiments, examples of suitable curing monomers include ethylenically-unsaturated cyclocarbonate monomers, such as vinyl cyclocarbonates (e.g., vynilidene carbonate, and cyclocarbolates obtained by carbonization of glycidyl methacrylate). The cyclocarbonate groups preferably compliment first-stage copolymers having amine-functional groups, which can undergo step-growth reactions with the cyclocarbonate groups.

The curing monomers, if present, may constitute, for example, greater than about 5%, more preferably greater than about 10%, and even more preferably greater than about 15% by weight of the second-stage monomers used to produce the second-stage copolymers. The curing monomers may also constitute less than about 40%, more preferably less than about 30%, and even more preferably less than about 25% by weight of the second-stage monomers used to produce the second-stage copolymers.

The ethylenically-unsaturated aromatic monomers, if present, may constitute, for example, greater than about 20%, more preferably greater than about 35%, and even more preferably greater than about 50% by weight of the second-stage monomers used to produce the second-stage copolymers. The ethylenically-unsaturated aromatic monomers may also constitute less than about 80%, more preferably less than about 75%, and even more preferably less than about 65% by weight of the second-stage monomers used to produce the second-stage copolymers.

Some of the above-described second-stage monomers may also fall within multiple monomer categories. For example, some of the monomers may qualify as both a meth(acrylate) monomer and an ethylenically-unsaturated aromatic monomer, such as benzyl (meth)acrylate. In these situations, unless expressly stated otherwise, the above-discussed concentration ranges for the ethylenically-unsaturated aromatic monomers encompasses all aromatic monomers of the second-stage monomers, including those that also qualify as meth(acrylate) monomers, ethylenically-unsaturated acid-functional monomers, ethylenically-unsaturated alcohol-functional monomers, ethylenically-unsaturated amine/amide-functional monomers and/or the curing monomers.

More preferably, the second-stage monomers include a combination of one or more non-aromatic (meth)acrylate monomers, one or more ethylenically-unsaturated aromatic monomers, and one or more curing monomers.

A first particularly suitable combination of second-stage monomers includes one or more non-aromatic (meth)acrylates, one or more vinyl aromatic monomers, and one or more oxirane-containing (meth)acrylates. In this first particularly suitable combination, the non-aromatic (meth)acrylates may constitute from about 5% to about 40% by weight, and more preferably from about 10% to about 30% by weight; the vinyl aromatic monomers may constitute from about 35% to about 75% by weight, and more preferably from about 50% to about 65% by weight; and the oxirane-containing (meth)acrylates may constitute from about 5% to about 30% by weight, and more preferably from about 10% to about 25% by weight; based on the entire weight of the second-stage monomers used to produce the second-stage copolymers.

A second particularly suitable combination of second-stage monomers includes one or more non-aromatic (methyl)acrylates, one or more aromatic (meth)acrylates, and one or more oxirane-containing (meth)acrylates, wherein the second-stage monomers are substantially free of styrene. This embodiment illustrates an example coating composition that is substantially free of styrene, where aromatic functionality is obtained with an aromatic (meth)acrylate (e.g., benzyl methacrylate). In this second particularly suitable combination, the non-aromatic (methyl)acrylates may constitute from about 10% to about 55% by weight, and more preferably from about 20% to about 40% by weight; the aromatic (meth)acrylates may constitute from about 30% to about 60% by weight, and more preferably from about 40% to about 50% by weight; and the oxirane-containing (meth)acrylates may constitute from about 5% to about 30% by weight, and more preferably from about 10% to about 25% by weight; based on the entire weight of the second-stage monomers used to produce the second-stage copolymers.

In some embodiments, the first and second particularly suitable combinations include, if any, less than 5%, more preferably less than 2%, even more preferably less than 1% of acid-functional monomer.

The second-stage polymerization may continue for a suitable duration to polymerize the second-stage monomers with a free-radical initiated polymerization process. The resulting second-stage copolymers, may be linear, branched, or combinations thereof. For example, the curing monomers preferably polymerize with other second-stage monomers to form pendant curing groups extending from the second-stage copolymers. As discussed below, these curing groups may react with step-growth-functional groups present on the first-stage copolymers during a subsequent curing step.

Preferred glass transition temperatures for the second-stage copolymer include those discussed above for the first-stage copolymer. Preferred glass transition temperatures for the overall resulting copolymers of the latex emulsion include those greater than about 20° C., more preferably greater than about 30° C., even more preferably greater than about 40° C., and most preferably greater than about 50° C. Preferred glass transition temperatures for the resulting copolymers of the latex emulsion also include those less than about 150° C., more preferably less than about 140° C., and even more preferably less than about 130° C.

Preferred acid numbers for the resulting copolymer latex (e.g., after the second-stage polymerization) include acid numbers greater than about 10, more preferably greater than about 20, and even more preferably greater than about 30 milligrams mg KOH per gram of the copolymer latex. In these embodiments, preferred acid numbers for the resulting copolymer latex (e.g., after the second-stage polymerization) also include acid numbers less than about 150, more preferably less than about 140, and even more preferably less than about 130 mg KOH per gram of the copolymer latex.

Moreover, preferred amounts of the first-stage monomers, relative to the total weight of the first-stage monomers and the second-stage monomers, include amounts greater than 30%, more preferably greater than 40%, and even more preferably greater than 45% by weight. In some embodiments, preferred amounts of the first-stage monomers, relative to the total weight of the first-stage monomers and the second-stage monomers, also include amounts less than 75%, more preferably less than 65%, and even more preferably less than 60% by weight.

Preferred amounts of the second-stage monomers, relative to the total weight of the first-stage monomers and the second-stage monomers, include amounts greater than 25%, more preferably greater than 35%, and even more preferably greater than 40% by weight. In some embodiments, preferred amounts of the second-stage monomers, relative to the first-stage monomers and the second-stage monomers, also include amounts less than 70%, more preferably less than 60%, and even more preferably less than 55% by weight.

The latex emulsion produced with the above-discussed two-stage polymerization process may optionally include additional polymerization stages, if desired. Such additional polymerization stages may occur at any suitable time (e.g., after the second stage, between the first and second stages, etc. . . . ). As mentioned above, the first and second polymerization stages are example stages for producing the overall resulting copolymers of the latex emulsion, and one or more seed polymerization stages and/or one or more additional post-polymerization stages may be used. Preferably, the first and second stage copolymers constitutes at least about 50% by weight of the resulting copolymers of the latex emulsion, more preferably at least about 75% by weight, even more preferably at least about 90% by weight, and even more preferably from about 95% to 100% by weight. In some embodiments, the resulting copolymers of the latex emulsion consist essentially of the first and second stage copolymers.

Furthermore, a coating composition may be formulated from the latex emulsion, optionally with the inclusion of one or more additives and/or by rheological modification for different coating applications (e.g., diluted for spray coating applications). In embodiments in which the coating composition includes one or more additives, the additives preferably do not adversely affect the latex emulsion, or a cured coating formed from the coating composition. For example, such optional additives may be included in the coating composition to enhance composition esthetics, to facilitate manufacturing, processing, handling, and application of the composition, and to further improve a particular functional property of the coating composition or a cured coating resulting therefrom.

Such optional additives include, for example, catalysts, dyes, pigments, toners, extenders, fillers, lubricants, anticorrosion agents, flow control agents, thixotropic agents, dispersing agents, antioxidants, adhesion promoters, light stabilizers, co-resins and mixtures thereof. Each optional additives is preferably included in a sufficient amount to serve its intended purpose, but not in such an amount to adversely affect the coating composition or a cured coating resulting therefrom.

One preferred optional additive is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art.

If used, the catalyst is preferably present in an amount of at least about 0.01% by weight, and more preferably at least about 0.1% by weight, based on the total solids weight of the coating composition. Furthermore, if used, the catalyst is also preferably present in an amount of no greater than about 3% by weight, and more preferably no greater than about 1% by weight, based on the total solids weight of the coating composition.

Another useful optional ingredient is a lubricant (e.g., a wax), which facilitates manufacture of metal closures and other fabricated coated articles by imparting lubricity to sheets of coated metal substrate. Preferred lubricants include, for example, Carnauba wax and polyethylene-type lubricants. If used, a lubricant is preferably present in the coating composition in an amount of at least about 0.1% by weight, and preferably no greater than about 2% by weight, and more preferably no greater than about 1% by weight, based on the total solids weight of the coating composition.

Another useful optional ingredient is a pigment, such as titanium dioxide. If used, a pigment is present in the coating composition in an amount of no greater than about 70% by weight, more preferably no greater than about 50% by weight, and even more preferably no greater than about 40% by weight, based on the total solids weight of the coating composition.

The above-discussed resulting copolymers of the multi-stage polymerization process may also be blended with one or more additional latex copolymers, as desired. In some embodiments, the above-discussed resulting copolymers are greater than about 50% by weight of the blended latex emulsion, more preferably greater than about 75%, even more preferably greater than about 90%, and even more preferably from about 95% to 100%, based on an entire weight of latex copolymers in the latex emulsion. In some embodiments, the latex copolymers of the latex emulsion consist essentially above-discussed resulting copolymers.

The latex emulsion may also incorporate one or more optional curing agents (e.g., crosslinking resins, sometimes referred to as "crosslinkers"). The choice of particular crosslinker typically depends on the particular product being formulated. For example, some coatings are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of BPA, BPF, BPS, glycidyl ether compounds thereof (e.g., BADGE), and epoxy novolacs.

Any of the well known hydroxyl-reactive curing resins can be used. For example, phenoplast, blocked isocyanates, and aminoplast curing agents may be used, as well as combinations thereof.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins. One specific example of a suitable aminoplast crosslinker is the fully alkylated melamine-formaldehyde resin commercially available from Cytec Industries, Inc. under the trade name of CYMEL 303.

As examples of other generally suitable curing agents are the blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have a number-average molecular weight of at least about 300, more preferably at least about 650, and even more preferably at least about 1,000.

The concentration of the curing agent (e.g., crosslinker) in the coating composition may depend on the type of curing agent, the time and temperature of the bake, and the molecular weight of the latex copolymer. If used, the crosslinker is typically present in an amount of up to about 50% by weight, preferably up to about 30% by weight, and more preferably up to about 15% by weight. If used, the crosslinker is typically present in an amount of at least about 0.1% by weight, more preferably at least about 1% by weight, and even more preferably at least about 1.5% by weight. These weight percentages are based on the total solids weight of the coating composition.

In some embodiments, the coating composition may be cured to achieve good crosslinking density without the use of an external crosslinker (e.g., phenolic crosslinkers). Additionally, the coating composition may be substantially free of formaldehyde and formaldehyde-conditioning materials, more preferably essentially free of these compounds, even more preferably essentially completely free of these compounds, and most preferably completely free of these compounds.

In preferred embodiments, the coating composition is substantially free or completely free of any structural units derived from bisphenol A ("BPA"), bisphenol F ("BPF"), bisphenol S ("BPS"), or any diepoxides thereof (e.g., diglycidyl ethers thereof such as the diglycidyl ether of BPA ("BADGE")). In addition, the coating composition is preferably substantially free or completely free of any structural units derived from a dihydric phenol, or other polyhydric phenol, having estrogenic agonist activity great than or equal to that of 4,4'-(propane-2,2-diyl)diphenol. More preferably, the coating composition is substantially free or completely free of any structural units derived from a dihydric phenol, or other polyhydric phenol, having estrogenic agonist activity greater than or equal to that of BPS. Even more preferably, the coating composition is substantially free or completely free of any structural units derived from a dihydric phenol, or other polyhydric phenol, having estrogenic agonist activity greater than 4,4'-(propane-2,2-diyl)bis(2,6-dibromophenol). Optimally, the coating composition is substantially free or completely free of any structural units derived from a dihydric phenol, or other polyhydric phenol, having estrogenic agonist activity greater than 2,2-bis(4-hydroxyphenyl)propanoic acid. The same is preferably true for any other components of a composition including the coating composition. See, for example, U.S. application Ser. No. 13/570,743 for a discussion of such structural units and applicable test methods.

In some further embodiments, the coating composition is substantially free or completely free of any acrylamide-type monomers (e.g., acrylamides or methacrylamide). Moreover, in some embodiments, the coating composition is substantially free or completely free of styrene (whether free or polymerized). As discussed above, in these embodiments, the first-stage monomers and/or the second-stage monomers may include other ethylenically-unsaturated aromatic compounds and/or ethylenically-unsaturated alicyclic compounds, such as aromatic (meth)acrylates and/or alicyclic (meth)acrylates, for example. In additional further embodiments, the coating composition is substantially free or completely free of halogenated monomers (whether free or polymerized), such as chlorinated vinyl monomers.

The coating composition may also optionally be rheologically modified for different coating applications. For example, the coating composition may be diluted with additional amounts of the aqueous carrier to reduce the total solids content in the coating composition. Alternatively, portions of the aqueous carrier may be removed (e.g., evaporated) to increase the total solids content in the coating composition. The final total solids content in the coating composition may vary depending on the particular coating application used (e.g., spray coating), the particular coating use (e.g., for interior can surfaces), the coating thickness, and the like.

In some embodiments, the coating composition preferably has a total solids content greater than about 5%, more preferably greater than about 10%, and even more preferably greater than about 15%, based on the total weight of the coating composition. The coating composition also preferably has a total solids content less than about 80%, more preferably less than about 60%, and even more preferably less than about 50%, based on the total weight of the coating composition. The aqueous carrier may constitute the remainder of the weight of the coating composition.

In some embodiments, such as for certain spray coating applications (e.g., inside spray for food or beverage cans), the coating composition may have a total solids content greater than about 5%, more preferably greater than about 10%, and even more preferably greater than about 15%, based on the total weight of the coating composition. In these embodiments, the coating composition may also have a total solids content less than about 40%, more preferably less than about 30%, and even more preferably less than about 25%, based on the total weight of the coating composition. In some of these embodiments, the coating composition may have a total solids content ranging from about 18% to about 22%. The aqueous carrier may constitute the remainder of the weight of the coating composition.

The coating composition preferably includes at least a film-forming amount of the latex emulsion copolymers of the present disclosure. As such, the latex emulsion copolymers preferably constitute greater than about 50%, more preferably greater than about 65%, and even more preferably greater than about 80% by weight of the coating composition, based on an entire weight of the total solids in the coating composition. The latex emulsion copolymers may constitute 100% or less, more typically less than about 99%, and even more typically less than about 95% by weight of the coating composition, based on the entire weight of the total solids in the coating composition.

As previously discussed, the aqueous carrier of the coating composition preferably includes water and may further include one or more optional organic solvents. In some embodiments, water constitutes greater than about 20% by weight, more preferably greater than about 35% by weight, and even more preferably greater than about 50% by weight of the total weight of the aqueous carrier. In some embodiments, water constitutes 100% or less, more preferably less than about 95% by weight, and even more preferably less than about 90% by weight of the total weight of the aqueous carrier.

While not intending to be bound by theory, the inclusion of a suitable amount of an organic solvent can be advantageous, in some embodiments (e.g., for certain coil coating applications to modify flow and leveling of the coating composition, control blistering, and maximize the line speed of the coil coater). Accordingly, in certain embodiments, the organic solvents may constitute greater than 0%, more preferably greater than about 5%, and even more preferably greater than about 10% by weight of the aqueous carrier, based on the total weight of the aqueous carrier. In these embodiments, the organic solvents may also constitute less than about 60%, more preferably less than about 50%, and even more preferably less than about 40% by weight of the aqueous carrier, based on the total weight of the aqueous carrier.

The coating composition preferably has a viscosity suitable for a given coating application. In some embodiments, such as for certain spray coating applications (e.g., those discussed below for FIGS. 2 and 3), the coating composition may have an average viscosity greater than about 30 seconds, more preferably greater than 40 seconds, and even more preferably greater than about 45, based on the Viscosity Test described below. In some embodiments, the coating composition may also have an average viscosity less than about 90 seconds, more preferably less than 80 seconds, and even more preferably less than about 75, based on the Viscosity Test described below.

The coating composition of the present disclosure having the emulsion polymerized latex copolymers may be applied to a variety of different substrates using a variety of different coating techniques. As briefly described above, cured coatings formed from the coating composition are particularly suitable for use on food and beverage cans (e.g., two-piece cans, three-piece cans, and the like). Two-piece cans are typically manufactured by a drawn and ironing ("D&I") process. The cured coatings are also suitable for use in food or beverage contact situations, and may be used on the inside or outside of such cans.

For instance, FIG. 1 shows container 20, which is a simplified example of a food or beverage container that may be coated with the coating composition of the present disclosure. Container 20 may be a two-piece can having body 22 and lid piece 24, where body 22 includes sidewall 26 and bottom end 28. Lid piece 24 may be sealed to body 22 in any suitable manner, and may optionally include one or more tabs (not shown) to facilitate peeling off or opening of lid piece 24 or a portion thereof (e.g., as is common for beverage can ends and easy-open food can ends).

Sidewall 26 and bottom end 28 respectively include interior surfaces 30 and 32, and suitable substrate materials for sidewall 26 and bottom end 28 include metallic materials, such as aluminum, iron, tin, steel, copper, and the like. One or more portions of interior surfaces 30 and 32 may be coated with coating 34, which is a cured coating formed from the latex emulsion of the present disclosure. In some embodiments, the interior surface of lid piece 24 may also be coated with coating 34. Alternatively, in some embodiments, the interior surface of lid piece 26 may be coated with coating 34, and interior surfaces 30 and 32 may be coated with other coating materials.

Furthermore, the coating composition is particularly suitable for spray applications for interior surfaces, such as the interior surfaces of food cans, beer and beverage containers, and the like. For example, the coating composition is particularly suitable for spray applications onto the interior surfaces (e.g., interior surfaces 30 and 32) of two-piece food or beverage cans (e.g., drawn and ironed beverage cans, which are typically made of steel or aluminum substrate).

Figure 2:
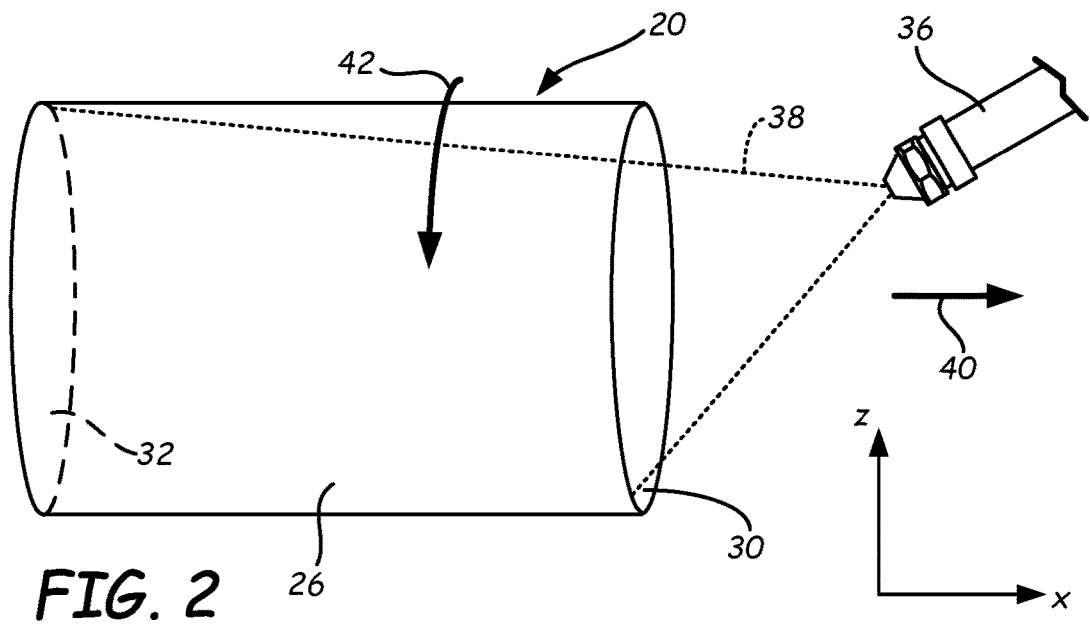
FIG. 2 is a front view of an example spray coating process for spraying the coating composition of the present disclosure onto an interior surface of a can, such as a food or beverage can.
Figure 3:
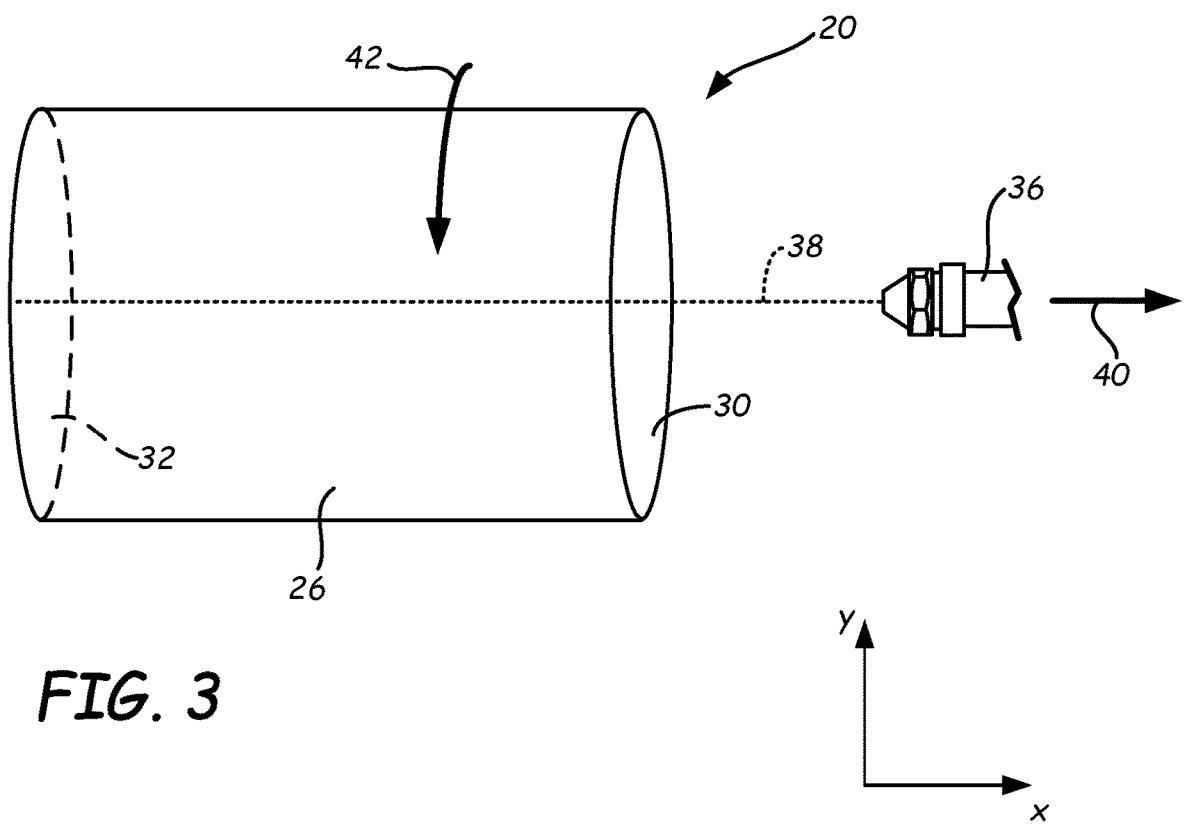
FIG. 3 is a top view of the example spray coating process shown in FIG. 2.

A suitable spray coating technique for applying the coating composition to an interior surface of a food or beverage can may involve spraying the coating composition using a spray nozzle capable of uniformly coating the inside of the can. For example, FIG. 2 illustrates a side view, and FIG. 3 illustrates a top view of an example setup for spray coating the coating composition onto the interior surfaces 30 and 32 of a can 20 with a spray nozzle 36. As shown, the spray nozzle 36 is preferably a controlled-pattern nozzle capable of generating a desired spray pattern, such as spray 38 having a flat-fan pattern as generally illustrated in FIGS. 2 and 3.

Furthermore, spray nozzle 36 is preferably stationary, and also preferably generates spray 38 without air pressure (e.g., an airless spray operation). In some embodiments (e.g., in which the can to be sprayed is large), spray nozzle 36 may utilize a "lance spray" technique, where spray nozzle 36 may move relative to the can to reach the far inside end of the can.

In addition, the can 20 itself may be engaged to a rotating mechanism (e.g., a drive roller or belt, and/or a rotatable chuck mount), which is configured to rotate the can 20 at a high speed (e.g., about 2,200 rpm) around its longitudinal axis 40, as illustrated by arrows 42. This rotation of the can 20 preferably spreads the sprayed coating composition evenly across the entire interior surfaces 30 and 32. As can be seen in FIG. 2, the flat-fan pattern of spray 38 is not evenly aligned with the longitudinal axis 40 of the can 20. As such, the pattern of spray 38, as dictated by spray nozzle 36, may be non-homogenous, where the lower portion of spray 38 has a greater density of the coating composition compared to the upper portion of spray 38.

After the spray coating application, each can 20 may be moved to a curing oven to cure the sprayed coating composition, which is preferably performed within about 40 to 200 seconds from the spraying step. The curing process is preferably performed in bulk with multiple cans 20 arranged together on a continuously moving conveyor belt or track. The curing oven preferably heats the cans 20 to a suitable temperature to cure the coating composition, but that is also preferably not too high so as to degrade the coating composition, any other existing coatings on cans 20, and/or the metal materials of cans 20.

Suitable curing temperatures for the coating composition of the present disclosure are greater than about 150° C. (about 300° F.), more preferably greater than about 165° C. (about 330° F.), and even more preferably greater than about 360° F. In some embodiments, suitable curing temperatures for the coating composition of the present disclosure are also less than about 220° C. (about 430° F.), more preferably less than about 205° C. (about 400° F.), and even more preferably less than about 195° C. (about 380° F.). These temperatures are based on peak metal temperature measurements of the metal walls of the cans 20 as they pass through the curing oven. For example, multiple cans 20 may be grouped together with a test can that is wired with thermocouples to measure the temperatures of one or more portions of the metal walls to ensure the cans 20 are heated enough.

Suitable residence times in the curing oven for the above-discussed temperatures range from about 40 seconds to about three minutes, more preferably about one minute to about two minutes. After curing, the resulting cured coatings (e.g., coating 34) may have suitable film thicknesses for protecting the cans 20 from food or beverage products that are subsequently filled into the cans 20.

The desired film thickness for the cured coating may vary depending on the particular food or beverage to be filled in a given can 20. In some embodiments for the spray coating application (e.g., inside spray for food or beverage cans), the average film thickness after curing is greater than about 0.7 milligrams/square-inch (mg/inch$^2$), more preferably greater than about 0.8 mg/inch$^2$, and even more preferably greater than about 0.9 mg/inch$^2$. In these embodiments, the average film thickness after curing is also less than about 4.0 mg/inch$^2$, more preferably less than about 3.0 mg/inch$^2$, and even more preferably less than about 2.5 mg/inch$^2$.

In some further embodiments, the average film thickness after curing ranges from about 0.9 mg/inch$^2$ to about 1.1 mg/inch$^2$. In other further embodiments, the average film thickness after curing ranges from about 1.4 mg/inch$^2$ to about 1.6 mg/inch$^2$. In yet other further embodiments, the average film thickness after curing ranges from about 1.9 mg/inch$^2$ to about 2.1 mg/inch$^2$.

Alternatively, the coating composition may applied as a coil coating. During a coil coating application, a continuous coil composed of a metal (e.g., steel or aluminum) is coated with the coating composition of the present disclosure. Once coated, the coating coil may be subjected to a short thermal, ultraviolet, and/or electromagnetic curing cycle, for hardening (e.g., drying and curing) of the coating composition. Coil coatings provide coated metal (e.g., steel and/or aluminum) substrates that can be fabricated into formed articles, such as two-piece drawn food cans, food can ends, drawn and ironed cans, beverage can ends, and the like.

The coating composition of the present disclosure also offers utility in other coating applications. These additional applications include, but are not limited to, wash coating, sheet coating, and side seam coatings (e.g., food can side seam coatings).

Other commercial coating application and curing methods are also envisioned, for example, electrocoating, extrusion coating, laminating, powder coating, and the like. The coating composition may also be useful in medical or cosmetic packaging applications, including, for example, on surfaces of metered-dose inhalers ("MDIs"), including on drug-contact surfaces.

During the above-discussed curing steps, the aqueous carrier is preferably vaporized or otherwise dried off from the emulsion polymerized copolymers, allowing them to cure. If desired, the drying and curing steps may be combined in a single step or carried out in separate steps.

In some embodiments, the coating composition may be cured with good crosslinking density without the use of an external crosslinker. For example, after curing, preferred coatings produced from the coating composition of the present disclosure without an external crosslinker may withstand more than 100 double rubs, and more preferably greater than 200 double rubs, based on the Solvent Resistance test discussed below.

Even more preferably, the cured coatings exhibit combinations of the above properties, including the Solvent Resistance test results, the Metal Exposure after Drop Damage test results, the Corrosion Resistance test results, and the flexibility results. In certain preferred embodiments, this is in additional to being suitable for use in spray coating applications to form spray coatings on interior can surfaces. Accordingly, the coating composition of the present disclosure is particularly suitable for use as food and beverage-contact coatings in containers (or portions thereof) configured retain a variety of different food or beverage products.

Property Analysis and Characterization Procedures

Various properties and characteristics of the latex emulsions, coating compositions, and coatings described herein may be evaluated by various testing procedures as described below:

1. Curing Conditions

For beverage inside spray bakes, the curing conditions involve maintaining the temperature measured at the can dome at 188° C. to 210° C. for 60 seconds. For beverage end coil bakes, the curing conditions involve the use of a temperature sufficient to provide a peak metal temperature within the specified time (e.g., 10 seconds at 204° C. means 10 seconds, in the oven, for example, and a peak metal temperature achieved of 204° C.). The constructions cited were evaluated by tests as follows.

2. Solvent Resistance

The extent of cure or crosslinking of a coating is measured as a resistance to methyl ethyl ketone (MEK, available from Exxon, Newark, N.J.). This test is performed as described in ASTM D 5402-93. The number of double-rubs (i.e., one back- and forth motion) is reported.

3. Adhesion

Adhesion testing is performed to assess whether the coating adheres to the coated substrate. The adhesion test was performed according to ASTM D 3359—Test Method B, using SCOTCH 610 tape, available from 3M Company of Saint Paul, Minn. Adhesion is generally rated on a scale of 0-10 where a rating of "0" indicates no adhesion failure (best), a rating of "1" indicates 90% of the coating remains adhered, a rating of "2" indicates 80% of the coating remains adhered, and so on. Adhesion ratings of 0 are typically desired for commercially viable coatings.

4. Blush Resistance

Blush resistance measures the ability of a coating to resist attack by various solutions. Typically, blush is measured by the amount of solution (e.g., water) absorbed into a coated film. When the film absorbs water, it generally becomes cloudy or looks white. Blush is generally measured visually using a scale of 0-10 where a rating of "0" indicates no blush (best) and a rating of "10" indicates complete whitening of the film (worst). Blush ratings of 3 or less are typically desired for commercially viable coatings, and optimally 1 or less.

5. Blush Adhesion Resistance

Blush Adhesion Resistance is a combination of adhesion resistance and blush resistance results as described above for the Adhesion test and the Bush Resistance test.

6. Corrosion Resistance

These tests measure the ability of a coating to resist attack by solutions of different levels of aggressiveness. Briefly, a given coating is subjected to a particular solution, as described below, and then measured for adhesion and blush resistance, each also described below. For each test, a result is given using a scale of 0-10, based on the adhesion and blush resistance, where a rating of "0" is best and a rating of "10 is worst. Commercially viable beverage interior coatings preferably give adhesion ratings of 0 and blush ratings of less than 3, optimally less than 1, in the given solutions tested.

A. Deionized Water

Deionized water is heated to 82° C. Coated panels are immersed in the heated solution for 30 minutes and then removed, rinsed, and dried. Samples are then evaluated for adhesion and blush, as previously described.

B. Joy Detergent Solution

A 1% solution of JOY Detergent (available from Procter & Gamble) in deionized water is prepared and heated to 82° C. Coated panels are immersed in the heated solution for 10 minutes and then removed, rinsed, and dried. Samples are then evaluated for adhesion and blush, as previously described.

C. Acetic Acid Solution

A 3% solution of acetic acid ($C_2H_4O_2$) in deionized water is prepared and heated to 100° C. Coated panels are immersed in the heated solution for 30 minutes and then removed, rinsed, and dried. Samples are then evaluated for adhesion and blush, as previously described.

D. Citric Acid Solution

A 2% solution of citric acid ($C_6H_8O_7$) in deionized water is prepared and heated while subjected to a pressure sufficient to achieve a solution temperature of 121° C. Coated panels are immersed in the heated solution for 30 minutes and then removed, rinsed, and dried. Samples are then evaluated for adhesion and blush, as previously described.

E. Cider Solution

A cider solution of 32.4 grams/liter malic acid, 9.6 grams/liter lactic acid, 12.9 grams/liter acetic acid, and 125 milligrams/liter sodium sulfite is prepared and heated to 37° C. Coated panels are immersed in the heated solution for 24 hours and then removed, rinsed, and dried. Samples are then evaluated for adhesion and blush, as previously described.

7. Crazing-Reverse Impact Resistance (RIR)

The reverse impact measures the coated substrate's ability to withstand the deformation encountered when impacted by a steel punch with a hemispherical head. For the present evaluation, coated substrate was subjected to 12 in-lbs (1.36 N m) of force using a BYK-Gardner "overall" Bend and Impact Tester and rated visually for micro-cracking or micro-fracturing commonly referred to as crazing. Test pieces were impacted on the uncoated or reverse side. A rating of 0 indicates no craze and suggests sufficient flexibility and cure. A rating of 10 indicates complete failure. Commercially viable coatings preferably show slight or no crazing on a reverse impact test.

8. Impact on Dome

Dome impact was evaluated by subjecting the dome apex of a 12-ounce beverage can to a reverse impact as described in the previous section. Craze was evaluated after impact. A rating of 0 indicates no craze and suggests sufficient flexibility and cure. A rating of 10 indicates complete failure. Coatings for beverage can interiors preferably show no craze (rating of 0) on a dome impact test.

9. Wedge-Bend

This is a flexibility test for a coating, and correlates to how a coating will withstand a can formation process (e.g., necking steps). Test coatings are applied to a suitable panel and cured. The coated panel is then bent around a 5-millimeter diameter metal rod having a 15-centimeter length. The bent panel is then flattened with a 2,400-gram hammer along its length with a folding height ranging between zero millimeters and six millimeters. The resulting panel is then immersed in a 10% hydrochloric acid (provided at a 36% concentration)/copper sulphate solution for a 3-minute duration. The corrosion is then rated by measuring the wedge bend length corroded and expressed in % of unaltered coating.

10. Metal Exposure after Drop Damage

Drop damage resistance measures the ability of the coated container to resist cracks after being in conditions simulating dropping of a filled can. The presence of cracks is measured by passing electrical current via an electrolyte solution, as previously described in the Metal Exposure section. A coated container is filled with the electrolyte solution and the initial metal exposure is recorded. The can is then filled with water and dropped through a tube from a 14-centimeter height onto an inclined plane, causing a dent in the chime area. The can is then turned 180 degrees, and the process is repeated.

Water is then removed from the can and metal exposure is again measured as described above. If there is no damage, no change in current (mA) will be observed. Typically, an average of 6 or 12 container runs is recorded. The metal exposures results for before and after the drop are reported as absolute values. The lower the milliamp value, the better the resistance of the coating to drop damage. Preferred coatings give metal exposure values after drop damage of less than 3.5 mA, more preferred values of less than 2.5 mA, and even more preferred values of less than 1.5 mA.

11. Sterilization or Pasteurization

The sterilization or pasteurization test determines how a coating withstands the processing conditions for different types of food products packaged in a container. Typically, a coated substrate is immersed in a water bath and heated for 5-60 minutes at temperatures ranging from 65° C. to 100° C. For the present evaluation, the coated substrate was immersed in a deionized water bath for 45 minutes at 85° C. The coated substrate was then removed from the water bath and tested for coating adhesion and blush as described above. Commercially viable coatings preferably provide adequate pasteurization resistance with perfect adhesion (rating of 0) and blush ratings of 5 or less, optimally 1 or less.

12. Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. The procedure is similar to the Sterilization or Pasteurization test. Testing is accomplished by subjecting the substrate to heat ranging from 105-130° C. and pressure ranging from 0.7 to 1.05 kilograms/square-centimeter for a period of 15 to 90 minutes.

For the present evaluation, the coated substrate is immersed in deionized water and subjected to heat of 121° C. (250° F.) and pressure of 1.05 kilograms/square-centimeter for a period of 90 minutes. The coated substrate is then tested for adhesion and blush as described above. In food or beverage applications requiring retort performance, adhesion ratings of 0 and blush ratings of 3 or less are typically desired for commercially viable coatings.

13. Global Extractions

The global extraction test is designed to estimate the total amount of mobile material that can potentially migrate out of a coating and into food packed in a coated can. Typically coated substrate is subjected to water or solvent blends under a variety of conditions to simulate a given end use. Acceptable extraction conditions and media can be found in 21 CFR § 175.300 paragraphs (d) and (e). The allowable global extraction limit as defined by the FDA regulation is 50 parts per million (ppm).

The extraction procedure used in the current invention is described in 21 CFR § 175.300 paragraph (e)(4)(xv) with the following modifications to ensure worst-case scenario performance: (1) the alcohol (ethanol) content was increased to 10% by weight, and (2) the filled containers were held for a 10-day equilibrium period at 37.8° C. (100° F.). These conditions are per the FDA publication "Guidelines for Industry" for preparation of Food Contact Notifications.

The coated beverage can is filled with 10% by weight aqueous ethanol and subjected to pasteurization conditions (65.6° C., 150° F.) for 2 hours, followed by a 10-day equilibrium period at 37.8° C. (100° F.). Determination of the amount of extractives is determined as described in 21 CFR § 175.300 paragraph (e) (5), and ppm values were calculated based on surface area of the can (no end) of 44 square inches with a volume of 355 milliliters. Preferred coatings give global extraction results of less than 50 ppm, more preferred results of less than 10 ppm, even more preferred results of less than 1 ppm. Most preferably, the global extraction results are optimally non-detectable.

14. Initial Metal Exposure

This test method determines the amount of the inside surface of the can that has not been effectively coated by the sprayed coating. This determination is made through the use of an electrically conductive solution (1% NaCl in deionized water). The coated can is filled with this room-temperature conductive solution, and an electrical probe is attached in contact to the outside of the can (uncoated, electrically conducting). A second probe is immersed in the salt solution in the middle of the inside of the can.

If any uncoated metal is present on the inside of the can, a current is passed between these two probes and registers as a value on an LED display. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings give metal exposure values of less than 3 mA, more preferred values of less than 2 mA, and even more preferred values of less than 1 mA. Commercially acceptable metal exposure values are typically less than 2.0 mA on average.

15. Viscosity Test

This test measures the viscosity of a latex emulsion or coating composition for rheological purposes, such as for sprayability and other coating application properties. The test was performed pursuant to ASTM D1200-88 using a Ford Viscosity Cup #2 at 80° F. The results are measured in the units of seconds.

EXAMPLES

The present disclosure is more particularly described in the following examples that are intended as illustrations only, since numerous modifications and variations within the scope of the present disclosure will be apparent to those skilled in the art. The following Table 1 lists some of the raw materials used in the following examples. Alternative materials or suppliers may be substituted as is appreciated to one skilled in the art.

TABLE 1

| Raw Material | Trade Name | Supplier |
| --- | --- | --- |
| Polymerizable Surfactant Monomer | REASOAP SR1025 | Adeka Corporation, Tokyo, Japan |
| Organic Acid Catalyst, 25% in ammonia | CYCAT 600 | Cyctec Industries, Inc., Woodland Park, NJ |
| Ammonium Persulphate | | Sigma-Aldrich Co. LLC, St. Louis, MO |
| Styrene | | Rohm & Haas, Philadelphia, PA |
| Methacrylic Acid | | Rohm & Haas, Philadelphia, PA |
| Ethyl Acrylate | | Rohm & Haas, Philadelphia, PA |
| Hydroxyethyl Methacrylate (HEMA) | | Rohm & Haas, Philadelphia, PA |
| Butyl Glycol | | The DOW Chemical Co., Midland, MI |
| Dimethylethanol Amine (DMEA) | | BASF SE, Ludwigshafen, Germany |
| Glycidyl Methacrylate (GMA) | | Rohm & Haas, Philadelphia, PA |
| Ferrous Sulphate Heptahydrate | | Sigma-Aldrich Co. LLC, St. Louis, MO |
| Tertioamyl Hydroperoxide | TAH 85 | Arkema, Inc., Colombes, France |
| Isoabscorbic Acid | | Sigma-Aldrich Co. LLC, St. Louis, MO |

Coating Composition CC1

A coating composition CC1 was prepared using the above-discussed two-stage polymerization process. For the first-stage polymerization, 790 parts of deionized water, 18 parts of the polymerizable surfactant monomer, and 10.2 parts of the organic acid catalyst were added to a reactor equipped, which was then heated under nitrogen sparge to 80° C. with agitation. Once equilibrium temperature was reached, an initiator solution and the first-stage monomers were introduced to the surfactant dispersion in the reactor continuously over a 75-minute duration while the reactor was maintained under nitrogen sparge at the temperature of 80° C. with agitation.

The initiator solution included 0.5 parts of ammonium persulphate and 40 parts of deionized water. The first-stage monomers included 144 parts styrene, 55 parts methacrylic acid, 37 parts ethyl acrylate, and 27 parts hydroxyethyl methacrylate (HEMA), which were carried in 20 parts of a buytl glycol solvent. After all of the initiator solution and the first-stage monomers were added, the reactor was held at the temperature of 80° C. under agitation for an additional 30 minutes to complete the first-stage emulsion polymerization, thereby producing an in situ latex emulsion having the first-stage copolymers. These first-stage copolymers included chain segments of the polymerizable surfactant monomer, and carboxylic acid groups.

A portion of the carboxylic acid groups of the resulting first-stage copolymers were then neutralized for water-dispersibility purposes. This included introducing 2.85 parts of dimethylethanol amine (DMEA) and 40 parts of deionized water over a period of 30 minutes. Then, after 15 additional minutes, a redox solution was introduced to the reactor, which included 0.001 parts of ferrous sulphate heptahydrate, 0.32 parts of tertioamyl hydroperoxide, and 10 parts of deionized water. Then a second initiator solution and the second-stage monomers were introduced to the reactor continuously over a 75-minute duration while the reactor was maintained under nitrogen sparge at the temperature of 80° C. with agitation.

The second initiator solution included 0.24 parts of isoabscorbic acid and 40 parts of deionized water. The second-stage monomers included 144 parts styrene, 55 parts glycidyl methacrylate (i.e., for the curing chains), 42 parts ethyl acrylate, and 11 parts hydroxyethyl methacrylate (HEMA), which were carried in 30 parts of a buytl glycol solvent.

After all of the second initiator solution and the second-stage monomers were added, the reactor was held at the temperature of 80° C. under agitation for an additional 30 minutes. Then a spike of the initiator and redox solutions was added to reduce the level of free monomers. The spike included 0.001 parts of ferrous sulphate heptahydrate, 0.3 parts of tertioamyl hydroperoxide, 0.2 parts of isoabscorbic acid, and 10 parts of deionized water. The reactor was maintained under nitrogen sparge at the temperature of 80° C. with agitation for an additional 90 minutes to complete the second-stage emulsion polymerization, thereby producing a latex emulsion having first-stage copolymers and second-stage copolymers, which were not linked via linkage chains. The second-stage copolymers, however, included curing chains with pendent oxirane groups for a subsequent curing step.

After the second-stage polymerization was completed, the reactor was slowly cooled down to 40° C. and filtered to collect the resulting latex emulsion, where no coagulum was visibly observable. The resulting latex emulsion had a total solids content of 31.8% by weight, an acid number of 66 mg KOH per gram of the resulting latex emulsion copolymers, a viscosity of 15 seconds based on the Viscosity Test, and a pH of 6.9. The resulting latex emulsion copolymers included monomer concentrations as listed below in Table 2.

TABLE 2

| First-Stage Monomers and Linkage Monomers | Percent by weight |
|---|---|
| Polymerizable Surfactant Monomer | 6.4 |
| Styrene | 51.2 |
| Methacrylic Acid | 19.6 |
| Ethyl Acrylate | 13.2 |
| Hydroxyethyl Methacrylate (HEMA) | 9.6 |
| Linkage Monomers | 0.0 |
| Second-Stage Monomers | |
| Styrene | 57.1 |
| Glycidyl Methacrylate (GMA) | 21.8 |
| Ethyl Acrylate | 16.7 |
| Hydroxyethyl Methacrylate (HEMA) | 4.4 |
| Total Monomers | |
| First-Stage Monomers | 52.7 |
| Linkage Monomers | 0.0 |
| Second-Stage Monomers | 47.3 |

The resulting latex emulsion was then diluted with a solution of deionized water and organic solvents to reach a viscosity between 15 and 25 seconds based on the Viscosity Test. This resulted in the coating composition CC1, which did not included any external crosslinker.

The coating composition CC1 was applied to flat aluminum and steel panels with an applied coating thickness of 4 grams/square-meter. Each applied coating composition was then cured for 60 seconds at a temperature of 193° C. to produce cured coatings. Each coating was then evaluated for use as an internal surface-coating for two-piece beverage cans, with involved subjecting the coating to corrosion resistance tests in different solutions, solution stability tests, and reverse impact crazing tests.

A. Solvent Resistance Testing

The applied and cured coatings for coating composition CC1 was subjected to a Solvent Resistance test to determine their extents of crosslinking. Comparative coatings produced from an epoxy-based coating composition were also tested for comparison. Table 3 lists the Solvent Resistance test results for the coating composition CC1 and the epoxy-based control for (i) initial coatings, and (ii) coatings aged for one month at 50° C., where the results are in a number of double rubs.

TABLE 3

| Coating Composition | Solution Stability Test Results (Initial) | Solution Stability Test Results (Aged) |
|---|---|---|
| Coating Composition CC1 | 240 | 230 |
| Epoxy control | 120 | 120 |

As shown in Table 3, the coating composition CC1 exhibited good crosslinking without requiring the use of an external crosslinker, and exceeded the results of the epoxy control. Furthermore, the coating composition CC1 maintained the ability to generate good crosslinking even after the aging conditions. This illustrates the good curing stability of this coating composition.

B. Corrosion Resistance Testing

The applied and cured coatings for coating composition CC1 were also subjected to various corrosion resistance tests pursuant to the above-described procedures for deionized water, the Joy detergent solution, the acetic acid solution, the citric acid solution, and the cider solution. A comparative coating produced from an epoxy-based coating composition were also tested for comparison. Table 4 lists the Blush Adhesion Resistance results for the coating composition CC1 and the epoxy-based control.

TABLE 4

| Corrosion Test Solution | Coating Composition CC5 | Epoxy control |
|---|---|---|
| Deionized Water | 0 | 0 |
| Joy Detergent Solution | 0 | 0 |
| Acetic Acid Solution | 4 | 0 |
| Citric Acid Solution | 2 | 0 |
| Cider Solution | 1 | 0 |

As shown in Table 4, the coatings exhibited suitable corrosion resistance, particularly to the less-aggressive solutions. As such, the coating composition CC1 may be used in a variety of such food and beverage environments.

C. Crazing Reverse Impact Resistance (RIR) Testing

The applied and cured coatings for coating composition CC1 were also subjected to the Crazing RIR testing, as described above, to measure the coated substrate's ability to withstand the deformation encountered when impacted by a steel punch with a hemispherical head. Table 5 lists the Crazing RIR test results for the coating composition CC1 and the epoxy-based control for (i) initial coatings, and (ii) uncured coating compositions aged for 15 days at 50° C. (and then applied and cured before testing).

TABLE 5

| Coating Composition | Crazing RIR (Initial) | Crazing RIR (15 Days) |
|---|---|---|
| Coating Composition CC1 | 0 | 3 |
| Epoxy control | 0 | 0 |

As shown in Table 5, the coating compositions exhibited good impact resistance.

Coating Compositions CC2 and CC3

Coating compositions CC2 and CC3 were prepared using the above-discussed two-stage polymerization process as used to produce the coating composition CC1. However, the coating compositions CC2 and CC3 did not include any polymerizable or non-polymerizable surfactant. Instead, these coating compositions illustrate how the first-stage monomers and the second-stage monomers may be sufficiently dispersed in an aqueous carrier without the use of separate surfactants to undergo emulsion polymerization processes.

For both coating compositions CC2 and CC3, the ammonium persulphate sufficiently dispersed the first-stage monomers and the second-stage monomers, and the resulting copolymers, in the aqueous carrier without the use of separate surfactants. After polymerization, the resulting latex copolymers were then neutralized to assist in maintaining water dispersibiltiy.

For the coating composition CC2, the resulting latex emulsion had a total solids content of 34.4% by weight, an acid number of 73.8 mg KOH per gram of the resulting latex emulsion copolymers, and a calculated glass transition temperature of 54° C. For the coating composition CC3, the resulting latex emulsion had a total solids content of 34.6% by weight, an acid number of 71.9 mg KOH per gram of the resulting latex emulsion copolymers, and a calculated glass transition temperature of 43° C. The resulting latex emulsion copolymers included monomer concentrations as listed below in Tables 6 and 7, respectively.

TABLE 6

|  | Percent by weight |
| --- | --- |
| First-Stage Monomers and Linkage Monomers | |
| Surfactant | 0.0 |
| Ethyl Acrylate | 40.9 |
| Styrene | 40.9 |
| Methacrylic Acid | 18.2 |
| Second-Stage Monomers | |
| Styrene | 66.7 |
| Glycidyl Methacrylate (GMA) | 11.1 |
| Ethyl Acrylate | 22.2 |
| Total Monomers | |
| First-Stage Monomers | 55.0 |
| Second-Stage Monomers | 45.0 |

TABLE 7

|  | Percent by weight |
| --- | --- |
| First-Stage Monomers and Linkage Monomers | |
| Surfactant | 0.0 |
| Ethyl Acrylate | 54.5 |
| Styrene | 27.3 |
| Methacrylic Acid | 18.2 |
| Second-Stage Monomers | |
| Styrene | 66.7 |
| Glycidyl Methacrylate (GMA) | 11.1 |
| Ethyl Acrylate | 22.2 |
| Total Monomers | |
| First-Stage Monomers | 55.0 |
| Second-Stage Monomers | 45.0 |

The complete disclosures of the patents, patent documents, and publications cited herein are incorporated by reference to the extent that they do not conflict with the present disclosure. Although the present disclosure has been described with reference to preferred embodiments, workers skilled in the art will recognize that changes may be made in form and detail without departing from the spirit and scope of the disclosure.

The invention claimed is:

1. An interior can coating composition including at least 50 weight percent, based on the weight of total solids in the coating composition, of a latex-based acrylic coating composition including a latex emulsion that is a reaction product of a method comprising:
emulsion polymerizing first-stage monomers in an aqueous carrier to produce a first-stage copolymer comprising water dispersing groups, wherein the first-stage monomers include greater than 3% by weight of step-growth-functional monomers having step-growth-functional groups, based on an entire weight of the first-stage monomers; and
emulsion polymerizing second-stage monomers in the presence of the first-stage copolymer to form a second-stage copolymer, wherein the second-stage copolymer is chemically different from the first-stage copolymer, and wherein the second-stage copolymer comprises a curing group configured to react with one of the step-growth-functional groups of the first-stage copolymer during a curing step;
wherein the coating composition is substantially free of structural units derived from each of (meth)acrylamide monomers, bisphenol A, and substantially free of polymerized or free halogenated monomers, and wherein the coating composition has:
a total solids content of less than 25%, based on the total weight of the coating composition;
wherein the aqueous carrier comprises greater than about 5% organic solvent, based on the total weight of the aqueous carrier; and
wherein the coating composition, when spray applied onto an interior of an aluminum beverage can and cured at 188° C. to 210° C. (measured at the can dome) for 60 seconds to provide a coating with an average film thickness of about 0.7 mg/in$^2$ to about 4.0 mg/in$^2$, exhibits a global extraction result of less than 50 ppm as measured according to the extraction procedure in 21 C.F.R. § 175.300, paragraphs (d)-(e).

2. The coating composition of claim 1, wherein the coating composition is an inside spray beverage can coating composition having a viscosity ranging from about 45 seconds to about 75 seconds, measured pursuant to ASTM D1200-88 using a Ford Viscosity Cup #2 at 80° F.

3. The coating composition of claim 1, wherein the first-stage emulsion polymerized latex copolymer comprises greater than about 10% by weight of the monomer units having the step-growth-functional groups.

4. The coating composition of claim 1, wherein the step-growth-functional groups comprise acid-functional groups, alcohol-functional groups, amine-functional groups, or combinations thereof.

5. The coating composition of claim 1, wherein the step-growth-functional groups comprise acid-functional groups, and wherein the acid-functional groups comprise carboxylic acid-functional groups, anhydrides thereof, salts thereof, or combinations thereof; and wherein the first-stage emulsion polymerized latex copolymer has an acid number of greater than 40 mg KOH per gram of the first-stage copolymer.

6. The coating composition of claim 1, wherein the first-stage copolymer has an acid number greater than about 80 milligrams potassium hydroxide per gram of first-stage copolymer.

7. The coating composition of claim 1, wherein the first-stage monomers comprise one or more polymerizable surfactant monomers.

8. The coating composition of claim 1, wherein emulsion polymerizing the first-stage monomers is performed without the use of any polymerizable or non-polymerizable surfactants.

9. The coating composition of claim 1, wherein the second-stage copolymer further comprises at least one functional group comprising an oxirane group, an isocyanate group, an azlactone group, an oxazoline group, a cyclocarbonate group, or a combination thereof.

10. The coating composition of claim 1, wherein the curing group comprises an oxirane group, and wherein the second-stage monomers comprise glycidyl methacrylate.

11. The coating composition of claim 10, wherein second-stage monomers comprise greater than 5% to less than 30% by weight of glycidyl methacrylate.

12. The coating composition of claim 1, wherein the second-stage monomers are, when considered overall, more hydrophobic relative to those of the first-stage copolymer.

13. The coating composition of claim 1, wherein the coating composition is substantially free of structural units derived from either bisphenol F or bisphenol S, and wherein the coating composition is substantially free of formaldehyde or formaldehyde-forming materials.

14. The coating composition of claim 1, wherein the coating composition is substantially free of styrene.

15. The coating composition of claim 1, wherein the first-stage copolymer has a glass transition temperature of greater than 30° C. and wherein the second-stage copolymer has a glass transition temperature of greater than 30° C., and wherein the first-stage monomers are present in an amount greater than 0% by weight to less than 75% by weight relative to the total weight of first-stage monomers and second-stage monomers.

16. The coating composition of claim 1, wherein after curing, the coating composition, without an external crosslinker, withstands more than 100 double rubs when tested: (i) after initial application; and (ii) following aging for one month at 50° C.

17. The coating composition of claim 1, wherein the coating composition comprises a phenoplast crosslinker.

18. An inside spray beverage can coating composition having a total solids content of greater than 15% to less than 25%, and including at least 50 weight percent, based on the weight of total solids in the coating composition, of a latex emulsion that is a reaction product of a method comprising:
    emulsion polymerizing first-stage monomers in an aqueous carrier to produce a first-stage copolymer comprising water dispersing groups, wherein the first-stage monomers include greater than 3% by weight, based on an entire weight of the first-stage monomers, of step-growth-functional monomers, wherein the step-growth functional monomers have one or more step-growth functional groups chosen from carboxylic acid-functional groups, anhydrides thereof, and salts thereof; alcohol-functional groups; or amine-functional groups; and
    emulsion polymerizing second-stage monomers in the presence of the first-stage copolymer to form a second-stage copolymer, wherein the second-stage copolymer is chemically different from the first-stage copolymer, and wherein the second-stage copolymer comprises a curing group comprising at least one functional group comprising an oxirane group, an isocyanate group, an azlactone group, an oxazoline group, a cyclocarbonate group, or a combination thereof;

wherein the coating composition is substantially free of structural units derived from each of (meth)acrylamide monomers, bisphenol A, bisphenol F, and bisphenol S, and substantially free of polymerized or free halogenated monomers; and wherein the first-stage copolymer includes a sufficient amount of water-dispersing groups so that the first-stage copolymer can function as a polymeric surfactant to facilitate emulsion polymerization of the second-stage monomers; wherein the aqueous carrier comprises greater than about 5% organic solvent, based on the total weight of the aqueous carrier; and, wherein the coating composition, when spray applied onto an interior of an aluminum beverage can and cured at 188° C. to 210° C. (measured at the can dome) for 60 seconds to provide a coating with an average film thickness of about 0.7 mg/in$^2$ to about 4.0 mg/in$^2$, exhibits a global extraction result of less than 50 ppm as measured according to the extraction procedure in 21 C.F.R. § 175.300, paragraphs (d)-(e).

19. The coating composition of claim 18, wherein the first-stage monomers comprise one or more polymerizable surfactant monomers.

20. The coating composition of claim 18, wherein emulsion polymerizing the first-stage monomers is performed without the use of any polymerizable or non-polymerizable surfactants.

21. The coating composition of claim 18, wherein after curing, the coating composition, without an external crosslinker, withstands more than 100 double rubs when tested: (i) after initial application; and (ii) following aging for one month at 50° C.

\* \* \* \* \*